United States Patent
Lee et al.

(10) Patent No.: US 12,255,322 B2
(45) Date of Patent: Mar. 18, 2025

(54) NEGATIVE ELECTRODE MATERIAL FOR SECONDARY BATTERY

(71) Applicant: Tera Technos Co, Ltd., Daejeon (KR)

(72) Inventors: Jae Woo Lee, Sejong-si (KR); Jin Gee Park, Daegu (KR); Sun Ho Choi, Sejong-si (KR); Jung Hoon Cheon, Sejong-si (KR); Sung Soo Kim, Daejeon (KR); Sichen Du, Täby (SE)

(73) Assignee: Tera Technos Co., Ltd., Daejeon (KR)

( * ) Notice: Subject to any disclaimer, the term of this patent is extended or adjusted under 35 U.S.C. 154(b) by 299 days.

(21) Appl. No.: 17/456,265

(22) Filed: Nov. 23, 2021

(65) Prior Publication Data
US 2023/0033377 A1 Feb. 2, 2023

(30) Foreign Application Priority Data

Jul. 21, 2021 (KR) .......... 10-2021-0095725

(51) Int. Cl.
*H01M 4/36* (2006.01)
*H01M 4/02* (2006.01)
(Continued)

(52) U.S. Cl.
CPC ............ *H01M 4/48* (2013.01); *H01M 4/366* (2013.01); *H01M 4/625* (2013.01); *H01M 2004/021* (2013.01); *H01M 2004/027* (2013.01)

(58) Field of Classification Search
CPC .. H01M 2004/027; H01M 4/48; H01M 4/366; H01M 4/625; H01M 2004/021
(Continued)

(56) References Cited

U.S. PATENT DOCUMENTS 11,066,305 B1 * 7/2021 Ionescu ................. C01B 33/023
2019/0020067 A1 * 1/2019 Son ................... H01M 10/0525

FOREIGN PATENT DOCUMENTS

CN 111180693 A * 5/2020 ........ H01M 10/0525
EP 3605671 A1 * 2/2020 .......... H01M 10/052
(Continued)

OTHER PUBLICATIONS

Search Report issued in corresponding European Patent Application No. 21208780.3, mailed May 13, 2022.
(Continued)

*Primary Examiner* — Allison Bourke
*Assistant Examiner* — Robert Gene West
(74) *Attorney, Agent, or Firm* — Knobbe, Martens, Olson & Bear, LLP

(57) ABSTRACT

A negative electrode material for a secondary battery includes a matrix containing silicon oxide, a composite oxide of one or more doping elements selected from the group consisting of an alkali metal, an alkaline earth metal, and a post-transition metal, and silicon, or a mixture thereof; and silicon nanoparticles dispersed and embedded in the matrix; wherein a hardness and a Young's modulus measured by a nanoindentation test are 4.0 GPa or more and 40 GPa or more, respectively, and in an X-ray diffraction pattern using a CuKα ray, a ratio ($A_1/A_2$) of an area ($A_1$) of a first peak present in a region where a diffraction angle 2θ is 10° to 27.4° to an area ($A_2$) of a second peak present in a region where the diffraction angle 2θ is 28±0.5° is 0.8 to 6.

16 Claims, 9 Drawing Sheets

(51) Int. Cl.
      *H01M 4/38*      (2006.01)
      *H01M 4/48*      (2010.01)
      *H01M 4/485*     (2010.01)
      *H01M 4/62*      (2006.01)
      *H01M 10/0525*   (2010.01)
      *H01M 10/054*    (2010.01)

(58) Field of Classification Search
      USPC ........................................................ 429/231
      See application file for complete search history.

(56) References Cited

FOREIGN PATENT DOCUMENTS

| | | | | | |
|---|---|---|---|---|---|
| JP | 2019029297 | A | * | 2/2019 | ............. C01B 32/05 |
| JP | 2021082612 | A | * | 5/2021 | .......... H01M 10/052 |
| KR | 2015-0045336 | | | 4/2015 | |
| KR | 20190065148 | A | | 6/2019 | |
| KR | 20190093176 | A | | 8/2019 | |
| KR | 2020-0065514 | | | 6/2020 | |
| KR | 20200100252 | A | * | 8/2020 | |
| KR | 20210074187 | A | | 6/2021 | |
| WO | WO-2019130787 | A1 | * | 7/2019 | ........ H01M 10/0525 |
| WO | WO-2020070990 | A1 | * | 4/2020 | |

OTHER PUBLICATIONS

Notice of Allowance issued in Korean Patent Application No. 10-2021-0095725, mailed May 9, 2022.
Office Action issued in Korean Patent Application No. 10-2021-0095725, mailed Feb. 7, 2022.

* cited by examiner

Example 1

Comparative Example 1

Comparative Example 2

Before Lithiation 21.2 μm

After Lithiation 24.5 μm

NEGATIVE ELECTRODE MATERIAL FOR SECONDARY BATTERY

CROSS-REFERENCE TO RELATED APPLICATIONS

This application claims priority under 35 U.S.C. § 119 to Korean Patent Application No. 10-2021-0095725, filed on Jul. 21, 2021, in the Korean Intellectual Property Office, the disclosure of which is incorporated herein by reference in its entirety.

TECHNICAL FIELD

The following disclosure relates to a negative electrode material for a secondary battery, and more particularly, to a negative electrode material for a secondary battery having an improved capacity and initial efficiency and cycle characteristics.

BACKGROUND

In various industrial fields such as electronic products, electrical and hybrid vehicles, and aerospace and drones, a demand for a secondary battery that has a high energy density and a high power density and may be used for a long period of time (that is, has a long lifespan) has continuously increased.

In general, a rechargeable secondary battery includes a positive electrode, a negative electrode, an electrolyte, and a separator, and a representative negative electrode material that is included in the negative electrode and is commercially used is graphite, but a theoretical maximum capacity of graphite is only 372 mAh/g.

Therefore, in order to implement a secondary battery having a high energy density, studies on the use of a chalcogenide-based material such as sulfur (maximum capacity: 1,675 mAh/g), a silicon-based material such as silicon (maximum capacity: 4,200 mAh/g) or silicon oxide (maximum capacity: 1,500 mAh/g), or a transition metal oxide as a negative electrode material for a secondary battery have been continuously conducted, and among various materials, a silicon-based negative electrode material has been spotlighted.

However, particulate silicon is used as a negative electrode material, battery characteristics rapidly deteriorate due to a short circuit, particle deintercalation, an increase in contact resistance, or the like caused by a large volume change of silicon during repeated charge and discharge cycling, and thus, the function of the battery is already lost in less than 100 cycles. In addition, in a case where silicon oxide is used as a negative electrode material, loss of lithium occurs due to irreversible products such as lithium silicate or lithium oxide, and the initial charge and discharge efficiency is rapidly reduced.

A technology for nanotizing silicon in a form of a wire or the like and turning the nanotized silicon into a composite with a carbon material or a technology for forming a composite oxide phase or pre-lithiating silicon oxide by doping silicon oxide with different metals has been suggested in order to address insufficiencies of the silicon-based negative electrode material. However, it is difficult for these technologies to be commercialized due to deterioration of the initial charge and discharge efficiency, the cycle characteristics, the high-rate characteristics, and the like.

RELATED ART DOCUMENT

Patent Document

Korean Patent Laid-Open Publication No. 10-2020-0065514

Korean Patent Laid-Open Publication No. 10-2015-0045336

SUMMARY

One embodiment is directed to providing a silicon-based negative electrode material for a secondary battery having a high battery capacity and improved initial reversible efficiency and stable cycle characteristics derived from properties such as a high hardness and excellent elasticity.

In one general aspect, a negative electrode material for a secondary battery includes a matrix containing silicon oxide, a composite oxide of one or more doping elements selected from the group consisting of an alkali metal, an alkaline earth metal, and a post-transition metal, and silicon, or a mixture thereof; and silicon nanoparticles dispersed and embedded in the matrix; wherein a hardness and a Young's modulus measured by a nanoindentation test are 4.0 GPa or more and 40 GPa or more, respectively, and in an X-ray diffraction pattern using a CuKα ray, a ratio ($A_1/A_2$) of an area ($A_1$) of a first peak present in a region where a diffraction angle 2θ is 10° to 27.4° to an area ($A_2$) of a second peak present in a region where the diffraction angle 2θ is 28±0.5° is 0.8 to 6.

In the X-ray diffraction pattern using the CuKα ray, a ratio ($L_1/L_2$) of a full-width at half maximum (FWHM) ($L_1$) of the first peak present in the region where the diffraction angle 2θ is 10° to 27.4° to a full-width at half maximum (FWHM) ($L_2$) of the second peak present in the region where the diffraction angle 2θ is 28±0.5° may be 6 to 15.

An intensity ratio ($I_1/I_2$) of a maximum intensity ($I_1$) of the first peak to a maximum intensity ($I_2$) of the second peak may be 0.05 to 1.25.

The first peak may be derived from amorphous silicon oxide, and the second peak may be derived from crystalline silicon.

An FWHM of a Raman peak of nanoparticulate silicon contained in the negative electrode material may be larger than an FWHM of a Raman peak of bulk single crystal silicon.

The FWHM of the Raman peak of the nanoparticulate silicon contained in the negative electrode material may be 4 to 20 $cm^{-1}$.

The following Expression 1 may be satisfied based on a Raman signal of silicon, $$1 < WN(Si)/WN(\text{ref}) \quad \text{(Expression 1)}$$

wherein WN(ref) is the center wavenumber of the Raman peak of the bulk single crystal silicon, and WN(Si) is the center wavenumber of the Raman peak of the nanoparticulate silicon contained in the negative electrode material.

When the negative electrode material is subjected to two-dimensional mapping analysis based on a Raman signal of silicon, a difference between a maximum value and a minimum value of a shift defined by the following Expression 2 under the following mapping conditions may be 5 $cm^{-1}$ or less, Mapping conditions: excitation laser wavelength=532 nm, laser power=0.1 mW, detector exposure time (exposure time per unit analysis area)=1 sec, focal length=30 mm, grating=1,800 grooves/mm, pixel resolution=1 cm$^{-1}$, and mapping size=14 μm×14 μm, $$\text{Shift} = WN^i(Si) - WN(\text{ref}) \quad \text{(Expression 2)}$$

wherein WN(ref) is the same as defined in Expression 1, and WN$^i$(Si) is the center wavenumber of the Raman peak of the nanoparticulate silicon contained in the negative electrode material in one pixel that is the unit analysis area at the time of the mapping analysis.

When a shift is analyzed based on a Raman signal of silicon at 20 different positions at random in a 20 mm×20 mm sample, a difference between a maximum value and a minimum value of a shift defined by the following Expression 2 may be 5 cm$^{-1}$ or less, Mapping conditions: excitation laser wavelength=532 nm, laser power=0.1 mW, detector exposure time (exposure time per unit analysis area)=1 sec, focal length=30 mm, grating=1,800 grooves/mm, and pixel resolution=1 cm$^{-1}$, $$\text{Shift} = WN^i(Si) - WN(\text{ref}) \quad \text{(Expression 2)}$$

wherein WN(ref) is the same as defined in Expression 1, and WN$^i$(Si) is the center wavenumber of the Raman peak of the nanoparticulate silicon contained in the negative electrode material in one pixel that is the unit analysis area at the time of the mapping analysis.

When a stress of the silicon nanoparticle is analyzed at 20 different positions at random in a 20 mm×20 mm sample, a compressive stress may be 80% or more.

The negative electrode material may include a plurality of negative electrode material particles, and the particles may have a composition uniformity represented by the following Expression 3, $$1.3 \leq UF(D) \quad \text{(Expression 3)}$$

wherein UF(D) is a value obtained by dividing an average doping element composition of the negative electrode material particles by a standard deviation of a doping element composition based on wt % of the composition.

An average diameter of the silicon nanoparticles may be 2 to 30 nm.

An interface between the silicon nanoparticle and the matrix may be a coherent interface.

The doping element may be one or more selected from lithium (Li), sodium (Na), potassium (K), rubidium (Rb), cesium (Cs), beryllium (Be), magnesium (Mg), calcium (Ca), strontium (Sr), barium (Ba), aluminum (Al), gallium (Ga), indium (In), tin (Sn), and bismuth (Bi).

The negative electrode material may be in a form of particles having an average diameter of the order of $10^0$ μm to the order of $10^1$ μm.

The negative electrode material may further include a coating layer containing carbon.

In another general aspect, a secondary battery includes the negative electrode material.

Other features and aspects will be apparent from the following detailed description, the drawings, and the claims.

DETAILED DESCRIPTION OF EMBODIMENTS

Figure 1:
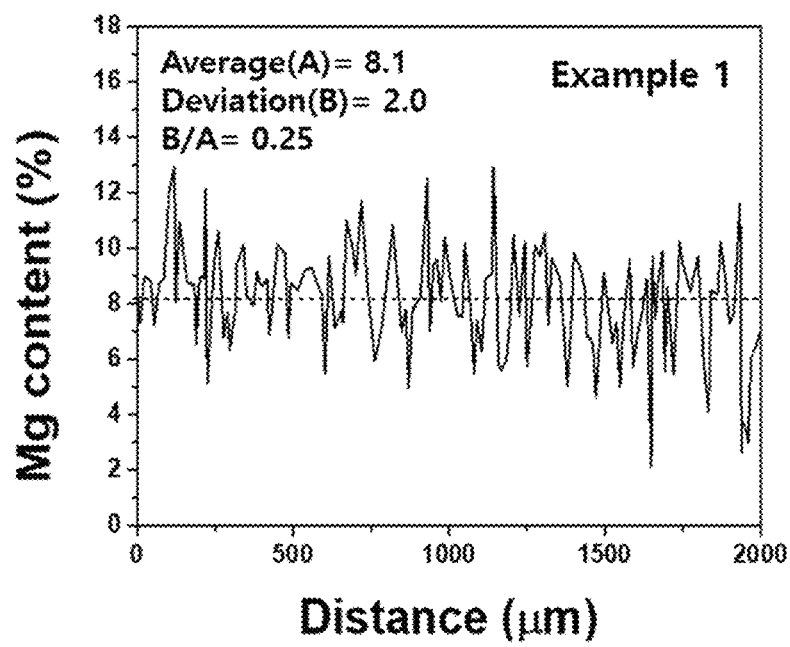
FIG. 1 is a view illustrating energy-dispersive X-ray spectroscopy (EDS) line profiles of Mg on cross sections of negative electrode materials produced according to embodiments.
Figure 1:
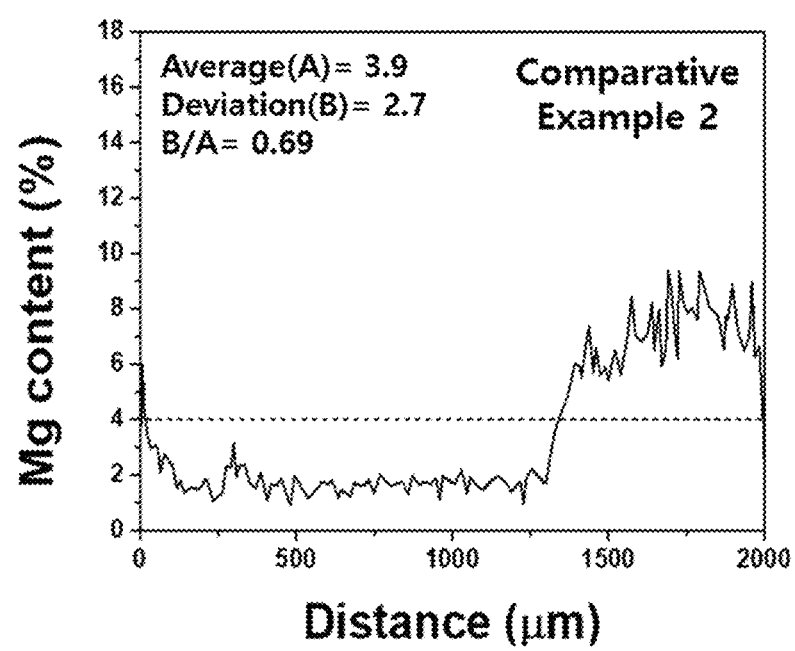

Hereinafter, a negative electrode material for a secondary battery according to embodiments will be described in detail with reference to the accompanying drawings. Technical terms and scientific terms used herein have the general meanings understood by those skilled in the art unless otherwise defined.

In addition, unless the context clearly indicates otherwise, the singular forms used in the specification and the scope of the appended claims are intended to include the plural forms.

The terms "first", "second", and the like in the present specification and the scope of the appended claims are not used as limiting meanings, but are used to distinguish one component from another component.

The terms "comprise(s)", "include(s)", "have (has)", and the like used in the present specification and the scope of the appended claims indicate the presence of described features or components in the specification, and do not preclude the presence or addition of one or more other features or components, unless specifically limited.

In the present specification and the scope of the appended claims, it will be understood that when an element such as a film (layer), a region, or a component is referred to as being "on" or "above" another element, it may be directly on another element while being in contact therewith or another film (layer), another region, or another component may be interposed therebetween.

The present applicant found that in a silicon-based negative electrode material in which silicon is turned into a composite with silicon-based oxide, mechanical properties and electrochemical properties of the negative electrode material are significantly affected by a residual stress of the silicon contained in the negative electrode material. As a result of intensively conducting studies based on these findings, the present applicant found that when silicon is dispersed in a form of nanoparticles in a silicon-based oxide-based matrix and has a residual compressive stress, the mechanical properties and the electrochemical properties of the negative electrode material are significantly improved.

Accordingly, the negative electrode material based on the findings described above has the mechanical properties and the electrochemical properties that may not be obtained in a silicon-based negative electrode material according to the related art and are obtained by a combination of the matrix and the silicon dispersed in a form of nanoparticles and having a residual compressive stress. Therefore, various aspects are included based on the physical properties of the silicon-based negative electrode material.

The matrix may refer to a solid medium in which nanoparticulate silicon is dispersed, and may refer to a material that forms a continuum unlike the silicon nanoparticles having a dispersed phase in the negative electrode material. In The matrix may refer to material(s) other than metal silicon (Si) in the negative electrode material.

The nanoparticle may refer to a particle having a size (diameter) of the order of $10^0$ nanometers to the order of $10^2$ nanometers, which is usually defined as a nanoparticle, and substantially, may refer to a particle having a diameter of 500 nm or less, specifically, a diameter of 200 nm or less, more specifically, a diameter of 100 nm or less, and still more specifically, a diameter of 50 nm or less.

The negative electrode material for a secondary battery includes a negative electrode material for a lithium secondary battery, but the present invention is not limited thereto. The negative electrode material may be used as an active material for a secondary battery such as a sodium battery, an aluminum battery, a magnesium battery, a calcium battery, or a zinc battery, and may be used in another energy storage and generation device using a silicon-based material according to the related art, such as a supercapacitor, a dye-sensitized solar cell, or a fuel cell.

A negative electrode material for a secondary battery according to an aspect (I) includes a matrix containing silicon oxide, a composite oxide of one or more doping elements selected from the group consisting of an alkali metal, an alkaline earth metal, and a post-transition metal, and silicon, or a mixture thereof; and silicon nanoparticles dispersed and embedded in the matrix; wherein a hardness and a Young's modulus measured by a nanoindentation test are 4.0 GPa or more and 40 GPa or more, respectively, and in an X-ray diffraction pattern using a CuKα ray, a ratio $(A_1/A_2)$ of an area $(A_1)$ of a first peak present in a region where a diffraction angle 2θ is 10° to 27.4° to an area $(A_2)$ of a second peak present in a region where the diffraction angle 2θ is 28±0.5° is 0.8 to 6.

Hereinafter, all the physical properties of the negative electrode material for a secondary battery are physical properties measured at room temperature (20 to 25° C.) unless specifically limited to the mechanical properties, in particular, a temperature.

Here, the nanoindentation test may be performed according to ASTM E2546, ISO 14577-1 E, ISO 14577-2 E, and ISO 14577-3 E, and a Young's modulus E may be calculated according to an expression of $E=E^*\cdot(1\ v^2)$ Here, $E^*$ is a Young's modulus of an indenter, and v is a Poisson's ratio of a Berkovich indenter and is assumed to be 0.3. The nanoindentation test using the Berkovich indenter may be performed under conditions of a maximum load of 50 mN and a load application rate of 100 mN/min. Each of the hardness and the Young's modulus measured by the nanoindentation test may be a value obtained by averaging physical property values measured by a nanoindentation test performed at a distance of at least 10 μm between indentation traces by the indenter in a form of a 5×5 to 25×25 matrix. In this case, the sample of the negative electrode material subjected to the nanoindentation test may be prepared by mounting and polishing a plate-like bulk negative electrode material.

Specifically, the hardness (indentation hardness) of the negative electrode material for a secondary battery measured by the nanoindentation test may be 4.0 GPa or more, 4.5 GPa or more, 5.0 GPa or more, 5.5 GPa or more, 6.0 GPa or more, 6.5 GPa or more, 7.0 GPa or more, 7.5 GPa or more, 8.0 GPa or more, 8.5 GPa or more, 9.0 GPa or more, 9.5 GPa or more, 10.0 GPa or more, 10.2 GPa or more, 10.4 GPa or more, 10.6 GPa or more, 10.8 GPa or more, 11.0 GPa or more, 11.2 GPa or more, 11.4 GPa or more, 11.6 GPa or more, 11.8 GPa or more, 12.0 GPa or more, 12.2 GPa or more, 12.4 GPa or more, 12.6 GPa or more, 12.8 GPa or more, or 13.0 GPa or more, and may be substantially 25.0 GPa or less, and more substantially, 20.0 GPa or less. In addition, the Young's modulus of the negative electrode material for a secondary battery measured by the nanoindentation test may be 40 GPa or more, 41 GPa or more, 42 GPa or more, 43 GPa or more, 44 GPa or more, 45 GPa or more, 50 GPa or more, or 55 GPa or more, and may be substantially 250 GPa or less, and more substantially, 200 GPa or less.

As described above, in the negative electrode material for a secondary battery, the silicon nanoparticles dispersed and embedded in the matrix are included, a high hardness of 4.0 GPa or more and an excellent Young's modulus of 40 GPa or more are exhibited, the hardness and the Young's modulus being measured by a nanoindentation test, and in the X-ray diffraction pattern using the CuKα ray, the ratio $(A_1/A_2)$ of the area $(A_1)$ of the first peak present in the region where the diffraction angle 2θ is 10° to 27.4° to the area $(A_2)$ of the second peak present in the region where the diffraction angle 2θ is 28±0.5° is 0.8 to 6, such that the negative electrode material has improved mechanical properties and electrochemical properties, and in particular, the negative electrode material has a capacity retention rate at which a secondary battery including the silicon-based negative electrode material may be commercialized.

In addition, the negative electrode material having a high hardness and an excellent elasticity refers to a particulate negative electrode material that is not physically damaged in an electrode producing process including preparation of a negative electrode material slurry, application and drying of the slurry on a current collector, and rolling (calendaring) established in advance in a secondary battery field according to the related art, and refers to a negative electrode material that may implement prevention to damage of an electrode (negative electrode) pore structure and thus may ensure stable and uniform contact with an electrolyte as it is designed. As a result, the negative electrode material for a secondary battery may secure structural stability, such that a battery performance may be stably implemented.

Specifically, the mechanical properties of the negative electrode material based on the nanoindentation test include the residual compressive stress of the nanoparticulate silicon and are physical property values that may be implemented by the residual stress present in the negative electrode material. In this case, the residual stress of the silicon nanoparticles included in the negative electrode material and dispersed and embedded in the matrix may exist in a form of a tensile stress or a compressive stress, or a mixed form of a tensile stress and a compressive stress, but the compressive stress, which is the main residual stress of the silicon nanoparticles included in the negative electrode material and dispersed and embedded in the matrix, may be uniform according to the crystallographic property in which the ratio ($A_1/A_2$) of the area ($A_1$) of the first peak to the area ($A_2$) of the second peak in the X-ray diffraction pattern is 0.8 to 6 as described above. Here, the residual compressive stress of the nanoparticulate silicon at which the mechanical property values of the negative electrode material are implemented may be determined by the center wavenumber of a Raman peak of nanoparticulate silicon based on the center wavenumber of a Raman peak of bulk single crystal silicon, and will be described in more detail in Raman characteristics to be described below.

As an embodiment, when the stress of the silicon nanoparticles is analyzed at 20 different positions at random in a 20 mm×20 mm sample (negative electrode material), the compressive stress may be 80% or more, substantially, 85% or more, and more substantially, 90% or more. An upper limit thereof is not limited, but may be substantially 99% or less.

The negative electrode material having a macro scale includes the silicon nanoparticles having a residual compressive stress throughout the sample, such that the mechanical properties and the electrochemical properties of the negative electrode material may be significantly improved, thereby commercializing a secondary battery including a silicon-based negative electrode material.

According to an embodiment, the ratio ($A_1/A_2$) of the area ($A_1$) of the first peak to the area ($A_2$) of the second peak may be 0.8 to 8, specifically, 0.8 to 6, and more specifically, 0.8 to 5.5. In this case, the area of each peak in the X-ray diffraction pattern refers to an integral area occupied by each peak. Here, the integral area may be an integral area obtained by fitting a peak from which a noise level is removed using a Gaussian function and/or a Lorentz function, and a method of deriving an area of an XRD peak may be used without limitation as long as the areas of the first peak and the second peak described above are derived by the same method.

As a specific example, the area of the XRD peak described above may be calculated by removing a noise level around the peak to be separated using a tool function of a peak analyzer of an origin program, one of the application software, and separating the peak into two by applying a Gaussian function, but the present invention is not limited thereto.

As a specific example, a ratio ($L_1/L_2$) of a full-width at half maximum (FWHM) ($L_1$) of the first peak to a full-width at half maximum (FWHM) ($L_2$) of the second peak in the X-ray diffraction pattern may be 1 to 20, specifically, 3 to 18, more specifically, 6 to 15, and still more specifically, 6.5 to 13.

As another specific example, an intensity ratio ($I_1/I_2$) of a maximum intensity ($I_1$) of the first peak to a maximum intensity ($I_2$) of the second peak may be 0.05 to 1.25, specifically, 0.05 to 1.05, and more specifically, 0.08 to 0.75. In this case, the first peak may be derived from amorphous silicon oxide, and the second peak may be derived from crystalline silicon. The negative electrode material for a secondary battery including amorphous silicon oxide may act as a buffer against volume expansion during charging of the secondary battery, and may thus have an excellent capacity retention rate.

A negative electrode material for a secondary battery according to another aspect (II) includes a matrix containing silicon oxide, a composite oxide of one or more doping elements selected from the group consisting of an alkali metal, an alkaline earth metal, and a post-transition metal, and silicon, or a mixture thereof; and silicon nanoparticles dispersed and embedded in the matrix; wherein in an X-ray diffraction pattern using a CuKα ray, a ratio ($A_1/A_2$) of an area ($A_1$) of a first peak present in a region where a diffraction angle 2θ is 10° to 27.4° to an area ($A_2$) of a second peak present in a region where the diffraction angle 2θ is 28±0.5° is 0.8 to 6, and the following Expression 1 is satisfied, $$1 < WN(Si)/WN(\text{ref}) \quad \text{(Expression 1)}$$

wherein WN(ref) is the center wavenumber of a Raman peak of bulk single crystal silicon, and WN(Si) is the center wavenumber of a Raman peak of nanoparticulate silicon contained in the negative electrode material.

In Expression 1, a ratio of the center wavenumber of the Raman peak of the nanoparticulate silicon contained in the negative electrode material to the center wavenumber of the Raman peak of the bulk single crystal silicon is a parameter indicating a type and a magnitude of a stress (residual stress) remaining in the silicon nanoparticles dispersed and embedded in the matrix. In addition, in Expression 1, the term "bulk single crystal silicon" should be interpreted to refer to silicon having a size substantially exhibited by the physical properties of the bulk single crystal silicon, and the bulk single crystal silicon may refer to a single crystal silicon wafer having a thickness of a sub mm order, as a specific example, having a thickness of 0.4 to 0.7 mm, in terms of providing clear comparison criteria and guaranteeing ease of availability.

Specifically, the case where WN(Si)/WN(ref) in Expression 1 exceeds 1 means that the center wavenumber of the Raman peak of the nanoparticulate silicon contained in the negative electrode material shifts to a longer wavenumber (a shorter wavelength than a wavelength of Raman scattered light) than that of the bulk single crystal silicon, which means that the nanoparticulate silicon has a residual compressive stress.

As described above, in the negative electrode material for a secondary battery, the silicon nanoparticles dispersed and embedded in the matrix and having a residual compressive stress are included, and in the X-ray diffraction pattern using the CuKα ray, the ratio ($A_1/A_2$) of the area ($A_1$) of the first peak present in the region where the diffraction angle 2θ is 10° to 27.4° to the area ($A_2$) of the second peak present in the region where the diffraction angle 2θ is 28±0.5° is 0.8 to 6, such that the negative electrode material has the mechanical properties and electrochemical properties improved by the silicon nanoparticles having a uniform residual compressive stress, and in particular, the negative electrode material has a capacity retention rate at which a secondary battery including the silicon-based negative electrode material may be commercialized.

Specifically, a compressive stress, which is a main residual stress of the silicon nanoparticles included in the negative electrode material and dispersed and embedded in the matrix, may be uniform according to the crystallographic property in which the ratio ($A_1/A_2$) of the area ($A_1$) of the first peak to the area ($A_2$) of the second peak in the X-ray diffraction pattern is 0.8 to 6 as described above.

In Expression 1, the Raman peak of silicon in each of the bulk single crystal silicon and the nanoparticulate silicon may be a Raman peak present in a region of 500 to 540 cm$^{-1}$, specifically, in a region of 510 to 530 cm$^{-1}$, and more specifically, in a region of 515 to 528 cm$^{-1}$, in a Raman spectrum of silicon. The center wavenumber of the peak, that is, a wavenumber corresponding to the center of the peak, may be a wavenumber having a maximum intensity value at the peak. In this case, when two or more Raman peaks are present in a Raman shift region, the peak having the highest intensity may correspond to the Raman peak of silicon of Expression 1, and when two or more Raman peaks appear in a bimodal form while being overlapped with each other, a wavenumber having a maximum intensity value at a peak having a higher intensity among two peaks may correspond to the center wavenumber of the peak.

In addition, the difference (WN(Si)−WN(ref)) between WN(Si) and WN(ref) is a parameter directly indicating a magnitude of the residual compressive stress of the silicon nanoparticles.

Specifically, the difference between WN(Si) and WN(ref) may be 0.1 $cm^{-1}$ or more, 0.2 $cm^{-1}$ or more, 0.3 $cm^{-1}$ or more, 0.4 $cm^{-1}$ or more, 0.5 $cm^{-1}$ or more, 0.6 $cm^{-1}$ or more, 0.7 $cm^{-1}$ or more, 0.8 $cm^{-1}$ or more, 0.9 $cm^{-1}$ or more, 1.0 $cm^{-1}$ or more, 1.1 $cm^{-1}$ or more, 1.2 $cm^{-1}$ or more, 1.3 $cm^{-1}$ or more, 1.4 $cm^{-1}$ or more, 1.5 $cm^{-1}$ or more, 1.6 $cm^{-1}$ or more, 1.7 $cm^{-1}$ or more, 1.8 $cm^{-1}$ or more, 1.9 $cm^{-1}$ or more, 2.0 $cm^{-1}$ or more, 2.1 $cm^{-1}$ or more, 2.2 $cm^{-1}$ or more, 2.3 $cm^{-1}$ or more, 2.4 $cm^{-1}$ or more, 2.5 $cm^{-1}$ or more, 2.6 $cm^{-1}$ or more, 2.7 $cm^{-1}$ or more, 2.8 $cm^{-1}$ or more, 2.9 $cm^{-1}$ or more, 3.0 $cm^{-1}$ or more, 3.1 $cm^{-1}$ or more, 3.2 $cm^{-1}$ or more, 3.3 $cm^{-1}$ or more, 3.4 $cm^{-1}$ or more, 3.5 $cm^{-1}$ or more, 3.6 $cm^{-1}$ or more, 3.7 $cm^{-1}$ or more, 3.8 $cm^{-1}$ or more, 3.9 $cm^{-1}$ or more, or 4.0 $cm^{-1}$ or more, and may be substantially 6.0 $cm^{-1}$ or less, and more substantially, 5.5 $cm^{-1}$ or less.

An FWHM of the Raman peak of the nanoparticle silicon contained in the negative electrode material may be larger than an FWHM of the Raman peak of the bulk single crystal silicon together with or independently of a difference between the center wavelengths at the Raman peaks of the bulk single crystal silicon and the nanoparticulate silicon contained in the negative electrode material. The FWHM value of the nanoparticle silicon larger than that of the bulk single crystal silicon may be due to a structure in which silicon contained in the negative electrode material is dispersed and embedded in the matrix in a form of extremely fine particles. Specifically, the FWHM of the Raman peak of the nanoparticulate silicon contained in the negative electrode material may be 4 to 20 $cm^{-1}$, 6 to 20 $cm^{-1}$, 6 to 18 $cm^{-1}$, 6 to 16 $cm^{-1}$, 8 to 20 $cm^{-1}$, 8 to 18 $cm^{-1}$, 8 to 16 $cm^{-1}$, 10 to 20 $cm^{-1}$, 10 to 18 $cm^{-1}$, or 10 to 16 $cm^{-1}$, but is not limited thereto.

Together with or independently of this, in the nanoparticulate silicon contained in the negative electrode material, an intensity ($K_1$) at a position (wavenumber) of +20 $cm^{-1}$ and an intensity ($K_2$) at a position (wavenumber) of −20 $cm^{-1}$ may be significantly different from each other in the Raman spectrum based on 0 $cm^{-1}$ of the center wavenumber of the Raman peak of silicon, and the intensity ($K_2$) at the position (wavenumber) of −20 $cm^{-1}$ may be higher than the intensity ($K_1$) at the position (wavenumber) of +20 $cm^{-1}$. In this case, the significant difference means that a ratio of $K_2/K_1$ may be 1.20 or more. The asymmetry (a long trail in a short wavenumber direction) of the Raman peak of silicon may also be due to the structure in which the silicon nanoparticles having a residual compressive stress are dispersed and embedded in the matrix.

In addition, when the negative electrode material is subjected to two-dimensional mapping analysis based on a Raman signal of silicon, a difference between a maximum value and a minimum value of a shift defined by the following Expression 2 may be 5 $cm^{-1}$ or less, $$\text{Shift} = WN^i(Si) - WN(\text{ref}) \quad \text{(Expression 2)}$$

wherein WN(ref) is the same as defined in Expression 1, and $WN^i(Si)$ is the center wavenumber of the Raman peak of the nanoparticulate silicon contained in the negative electrode material in one pixel that is the unit analysis area at the time of the mapping analysis. Here, a shift according to Expression 2 may be calculated in each pixel only for the pixels in which a Raman signal of silicon is detected in a two-dimensional Raman map obtained by the two-dimensional mapping analysis, and the maximum value and the minimum value may refer to a maximum value and a minimum value among the shifts calculated by Expression 2, respectively.

On the basis of the two-dimensional Raman map of the silicon obtained by the two-dimensional mapping analysis of the negative electrode material based on the Raman signal of the silicon, the difference between the maximum value and the minimum value of the shift value (shift) of the center wavenumber of the peak of the silicon compared to the bulk single crystal silicon according to Expression 2 is an index indicating a residual compressive stress uniformity of the silicon nanoparticles dispersed and embedded in the negative electrode material. The difference between the maximum value and the minimum value of the shift based on the two-dimensional Raman map may be 5.0 $cm^{-1}$ or less, 4.5 $cm^{-1}$ or less, 4.0 $cm^{-1}$ or less, 3.5 $cm^{-1}$ or less, 3.0 $cm^{-1}$ or less, 2.5 $cm^{-1}$ or less, or 1.0 $cm^{-1}$ or less, and the difference between the maximum value and the minimum value may be substantially 0.1 $cm^{-1}$ or more, and more substantially, 0.5 $cm^{-1}$ or more. The difference between the maximum value and the minimum value may mean that most of the silicon nanoparticles and substantially all the silicon nanoparticles contained in the negative electrode material have a residual compressive stress, and further may mean that the magnitudes of the residual compressive stress remaining in most of the silicon nanoparticles and substantially all the silicon nanoparticles are substantially the same as each other.

Experimentally, the Raman spectrum of the silicon contained in the negative electrode material may be measured under conditions of a temperature of room temperature (20 to 25° C.), a pressure of atmospheric pressure, an excitation laser wavelength of 532 nm, a laser power of 0.5 mW, a resolution of a spectrometer of 1 $cm^{-1}$, 1 g of a negative electrode material, and a detector exposure time of 15 sec.

Experimentally, the two-dimensional Raman mapping of the negative electrode material using the Raman signal of the silicon may be measured under mapping conditions of an excitation laser wavelength of 532 nm, a laser power of 0.1 mW, a detector exposure time (exposure time per unit analysis area) of 1 sec, a focal length of 30 mm, a grating of 1,800 grooves/mm, a pixel resolution of 1 $cm^{-1}$, and a mapping size of 14 μm×14 μm, and may be measured under room temperature and atmospheric pressure.

As a specific example, when the shift is analyzed based on the Raman signal of the silicon at 20 different positions at random in a 20 mm×20 mm sample, the difference between the maximum value and the minimum value of the shift defined by Expression 2 may be 5.0 $cm^{-1}$ or less, 4.5 $cm^{-1}$ or less, 4.0 $cm^{-1}$ or less, 3.5 $cm^{-1}$ or less, 3.0 $cm^{-1}$ or less, 2.5 $cm^{-1}$ or less, or 1.0 $cm^{-1}$ or less, and the difference between the maximum value and the minimum value may be substantially 0.1 $cm^{-1}$ or more, and more substantially, 0.5 $cm^{-1}$ or more. This means that the magnitudes of the compressive stress remaining in all the silicon nanoparticles included not only in the mapping region, but also in the entire of the sample, that is, in the substantially entire sample are almost the same as each other.

In this case, the Raman spectrum and the two-dimensional Raman mapping used for the shift analysis may be measured under the same conditions as described above.

A negative electrode material for a secondary battery according to still another aspect (III) is a particulate negative electrode material including a matrix containing silicon oxide, a composite oxide of one or more doping elements selected from the group consisting of an alkali metal, an alkaline earth metal, and a post-transition metal, and silicon, or a mixture thereof; and silicon nanoparticles dispersed and embedded in the matrix; wherein a compressive strength (St) of the particles is 100 MPa or more, and in an X-ray diffraction pattern using a CuKα ray, a ratio ($A_1/A_2$) of an area ($A_1$) of a first peak present in a region where a diffraction angle 2θ is 10° to 27.4° to an area ($A_2$) of a second peak present in a region where the diffraction angle 2θ is 28±0.5° is 0.8 to 6.

The compressive strength (St) of the particles may be calculated according to an expression of $$St = \frac{2P}{\pi dL},$$

in which P is an applied force, d is a particle diameter of the particle, and L is a distance. The compressive strength (St) of the particles may be measured using a micro-compressive tester (for example, MCT-W500-E, Shimadzu Corporation).

Specifically, the compressive strength of the particles of the particulate negative electrode material for a secondary battery may be 100 MPa or more, 105 MPa or more, 110 MPa or more, 115 MPa or more, 120 MPa or more, 125 MPa or more, 130 MPa or more, 135 MPa or more, 140 MPa or more, 145 MPa or more, 150 MPa or more, 155 MPa or more, or 160 MPa or more, and may be substantially 250 MPa or less, and more substantially, 200 MPa or less.

The mechanical properties of the negative electrode material described above include the residual compressive stress of the nanoparticulate silicon and are physical property values that may be implemented by the residual stress present in the negative electrode material. Furthermore, a stress field may be formed in the matrix surrounding the silicon nanoparticles having a residual compressive stress by a coherent interface between the silicon nanoparticle and the matrix, and the mechanical hardness and the elasticity may be further improved.

A negative electrode material for a secondary battery according to still another aspect (IV) includes a matrix containing, based on an element component, silicon (Si), one or more doping elements (D) selected from the group consisting of an alkali metal, an alkaline earth metal, and a post-transition metal, and oxygen (O); and silicon nanoparticles dispersed and embedded in the matrix; wherein the negative electrode material has a composition uniformity satisfying the following Expression 3, and in an X-ray diffraction pattern using a CuKα ray, a ratio ($A_1/A_2$) of an area ($A_1$) of a first peak present in a region where a diffraction angle 2θ is 10° to 27.4° to an area ($A_2$) of a second peak present in a region where the diffraction angle 2θ is 28±0.5° is 0.8 to 6, $$B/A \leq 0.65 \quad \text{(Expression 3)}$$

wherein A is an average value (A) obtained by averaging contents (wt %) of the doping elements measured at 100 random points based on a cross section crossing the center of the negative electrode material, and B is a standard deviation (B). Specifically, A may be an average content (wt %, A) of the doping elements calculated at 100 random points in a line profile of the doping elements crossing the center of the cross section of the negative electrode material and B may be a standard deviation (B).

More specifically, B/A in Expression 3 may be 0.65 or less, 0.60 or less, 0.55 or less, 0.50 or less, 0.40 or less, or 0.30 or less, and may be 0.2 or more.

In Expression 3, B/A is a parameter indicating a composition uniformity of the negative electrode material based on the doping elements (D). The negative electrode material may have uniform mechanical and electrochemical properties due to the excellent composition uniformity of B/A.

In addition, in an embodiment, in the negative electrode material including a plurality of negative electrode material particles, the particles may have a composition uniformity represented by the following Expression 4, $$1.3 \leq UF(D) \quad \text{(Expression 4)}$$

wherein UF(D) is a value obtained by dividing an average doping element composition of the negative electrode material particles by a standard deviation of a doping element composition based on wt % of the composition. In this case, the number of the plurality of negative electrode material particles may be 10 to 500, substantially, 50 to 300, and more substantially, 100 to 200.

Specifically, UF(D) in Expression 4 may be 1.3 or more, 1.5 or more, 2 or more, 2.5 or more, 3 or more, or 5 or more, and may be substantially 8 or less. UF(D) described above is a parameter indicating a composition uniformity between the negative electrode material particles in the negative electrode material including the plurality of negative electrode material particles. When UF(D) in Expression 4 satisfies the range described above, the negative electrode material including the plurality of negative electrode material particles has an excellent composition uniformity. As a result, the mechanical properties and the electrochemical properties of the negative electrode material may be uniform even though the plurality of negative electrode material particles are included.

Experimentally, the content or linear composition analysis of the doping elements may be performed using an electron probe micro analyzer (EPMA), energy-dispersive X-ray spectroscopy (EDS) provided in a transmission electron microscope or a scanning electron microscope, or the like, but the present invention is not limited thereto.

In the negative electrode material for a secondary battery satisfying the composition uniformity described above, the matrix may contain, based on an element component, one or more doping elements (D) selected from the group consisting of an alkali metal and an alkaline earth metal, silicon (Si), and oxygen (O), and the matrix may contain, based on a compound component, silicon oxide and a composite oxide of a doping element and silicon. Accordingly, the composition uniformity of the doping elements defined by Expression 3 may correspond to the composition uniformity of the composite oxide, but the present invention is not limited thereto.

A negative electrode material for a secondary battery according to still another aspect (V) includes a matrix containing silicon oxide, a composite oxide of one or more doping elements selected from the group consisting of an alkali metal, an alkaline earth metal, and a post-transition metal, and silicon, or a mixture thereof; and silicon nanoparticles dispersed and embedded in the matrix; wherein when charging to 0.005 V is performed based on a negative electrode active layer in which 80 wt % of a negative electrode material, 10 wt % of a conductive material, and 10 wt % of a binder are formulated, a volume change of the negative electrode active material layer is within 60%, and in an X-ray diffraction pattern using a CuKα ray, a ratio $(A_1/A_2)$ of an area $(A_1)$ of a first peak present in a region where a diffraction angle 2θ is 10° to 27.4° to an area $(A_2)$ of a second peak present in a region where the diffraction angle 2θ is 28±0.5° is 0.8 to 6.

In this case, the volume change (%) described above is a volume change of the negative electrode active material layer containing the negative electrode material, and may be defined as an expression of [thickness of negative electrode active material layer after lithiation—thickness of negative electrode active material layer before lithiation]/thickness of negative electrode active material layer before lithiation*100. Experimentally, each of the thicknesses of the negative electrode active material layer before and after lithiation may be measured through photographs observed with a scanning electron microscope and the like.

When a battery including the negative electrode active material layer is charged to 0.005 V, a volume change of only 60% or less, and specifically, 50% or less, 40% or less, 30% or less, or 15% or less means that the volume change is significantly smaller than that of the silicon-based negative electrode material according to the related art, and also means that undesirable cracking and/or deintercalation of the electrode due to volume expansion is significantly suppressed.

The negative electrode active material layer, which is the standard for testing a degree of volume expansion of the negative electrode material may contain 80 wt % of a negative electrode material, a conductive material, specifically, 10 wt % of carbon black, and 10 wt % of a binder. Specifically, the binder may contain 5 wt % of carboxymethyl cellulose and 5 wt % of styrene butadiene rubber. In the negative electrode including the negative electrode active material layer, a current collector may be a copper foil. The thickness of the negative electrode active material layer before lithiation may be, but not limited to, 15 to 25 μm.

The charging using the negative electrode material may be performed by a charge and discharge test according to the following charge and discharge cycle conditions using a half cell in which a negative electrode containing a negative electrode material and a counter electrode are metal lithium foils, and may be charging to 0.005 V at a charge and discharge cycle, specifically, at the first charge and discharge cycle.

Charge and discharge cycle conditions: CC/CV, cut-off voltage of 0.005 V to 1.0 V, rate of 0.5 C Hereinafter, unless otherwise limited, the electrochemical properties (charge and discharge characteristics, discharge capacity, dQ/dV graph, and the like) of the negative electrode material whose volume is changed during lithiation described above may be electrochemical properties of a half cell in which a negative electrode including a negative electrode material and a counter electrode are metal lithium foils, or may be electrochemical properties of a half cell subjected to a formation process.

The half cell may be a cell including a negative electrode including a negative electrode current collector and a negative electrode active material layer positioned on at least one surface of the current collector and including the negative electrode material according to an embodiment; a counter electrode that is a metal lithium foil; a separator interposed between the negative electrode and the counter electrode; and an electrolyte in which $LiPF_6$ is dissolved at a concentration of 1 M in a mixed solvent in which ethylene carbonate and diethyl carbonate are mixed in a volume ratio of 1:1, and the electrochemical properties of the half cell may be measured at room temperature.

The formation process may include a first process in which charging and discharging are performed under conditions of CC/CV, a cut-off voltage of 0.005 V to 1.5 V, and a rate of 0.1 C and a second process in which charging and discharging are performed under conditions of CC/CV, a cut-off voltage of 0.005 V to 1.0 V, and a rate of 0.1 C, but is not limited by the formation process conditions of the test battery (half cell), and the formation process may be sufficient as long as it is a formation process usually performed in a battery used for testing the electrochemical properties of the negative electrode material according to the related art.

A negative electrode material for a secondary battery according to still another aspect (VI) includes a matrix containing silicon oxide, a composite oxide of one or more doping elements selected from the group consisting of an alkali metal, an alkaline earth metal, and a post-transition metal, and silicon, or a mixture thereof; and silicon nanoparticles dispersed and embedded in the matrix; wherein a lithium intercalation peak corresponding to a $Li_{3.75}Si$ reaction is present in a dQ/dV graph obtained by a charge and discharge test according to the following charge and discharge cycle conditions using a half cell in which a counter electrode is a metal lithium foil, a discharge capacity at the first charge and discharge cycle is 1,200 mAh/g or more, and in an X-ray diffraction pattern using a CuKα ray, a ratio $(A_1/A_2)$ of an area $(A_1)$ of a first peak present in a region where a diffraction angle 2θ is 10° to 27.4° to an area $(A_2)$ of a second peak present in a region where the diffraction angle 2θ is 28±0.5° is 0.8 to 6.

Charge and discharge cycle conditions: CC/CV, cut-off voltage of 0.005 V to 1.0 V, rate of 0.5 C The dQ/dV graph may be a graph showing a relationship between a potential V and a differential value dQ/dV obtained by differentiating a battery capacity (discharge capacity) Q at the first charge and discharge cycle by a potential V of a negative electrode based on the metal lithium foil of the half cell. In this case, the lithium intercalation peak corresponding to the $Li_{3.75}Si$ reaction on the dQ/dV graph may be a peak present in a voltage range of 0.005 V to 0.100 V, specifically, a voltage range of 0.005 V to 0.050 V, and more specifically, a voltage range of 0.005 V to 0.040 V.

That is, in the negative electrode material for a secondary battery according to still another aspect (VI), the lithium intercalation is performed up to $Li_{3.75}Si$ beyond $Li_{3.5}Si$. The lithium intercalation is performed up to $Li_{3.75}Si$, such that the capacity of the negative electrode material may be improved. As a substantial example, during charging and discharging according to the charge and discharge cycle conditions of the half cell, a first discharge capacity (C1) after the formation process may be 1,200 mAh/g or more, 1,250 mAh/g or more, 1,300 mAh/g or more, 1,350 mAh/g or more, 1,400 mAh/g or more, or 1,500 mAh/g or more, and may be substantially 2,500 mAh/g or less.

A negative electrode material for a secondary battery according to still another aspect (VII) includes a matrix containing silicon oxide, a composite oxide of one or more doping elements selected from the group consisting of an alkali metal, an alkaline earth metal, and a post-transition metal, and silicon, or a mixture thereof; and silicon nanoparticles dispersed and embedded in the matrix, wherein when a charge and discharge test is performed according to the following charge and discharge cycle conditions using a half cell in which a counter electrode is a metal lithium foil, Expression 5 is satisfied, and in an X-ray diffraction pattern using a CuKα ray, a ratio $(A_1/A_2)$ of an area $(A_1)$ of a first peak present in a region where a diffraction angle 2θ is 10° to 27.4° to an area $(A_2)$ of a second peak present in a region where the diffraction angle 2θ is 28±0.5° is 0.8 to 6, Charge and discharge cycle conditions: CC/CV, cut-off voltage of 0.005 V to 1.0 V, rate of 0.5 C $$95\% \leq C50/C1*100 \quad \text{(Expression 5)}$$

wherein C1 is a discharge capacity (mAh/g) of the negative electrode material at the first charge and discharge cycle, and C50 is a discharge capacity of the negative electrode material at the fiftieth charge and discharge cycle. In this case, C1 at the first charge and discharge cycle may be a discharge capacity of the negative electrode material measured after the formation process is performed once and/or twice.

Specifically, C50/C1*100 may be 95% or more, 96% or more, 97% or more, 98% or more, or 99% or more. Such cycle characteristics mean that the storage and release of lithium ions in the negative electrode material are substantially completely reversible, mean that capacity degradation (deterioration of the negative electrode material, deterioration of electrical contact of the negative electrode material in the negative electrode active material layer, formation of irreversible products, or the like) does not substantially occur in the repeated charge and discharge process up to 50 times, and mean that the negative electrode material has an extremely excellent capacity retention rate.

As a specific example, C50 may be 1,150 mAh/g or more, 1,200 mAh/g or more, 1,250 mAh/g or more, 1,300 mAh/g or more, 1,350 mAh/g or more, or 1,450 mAh/g or more, and may be substantially 2,450 mAh/g or less.

A negative electrode material for a secondary battery according to still another aspect (VIII) includes a matrix containing silicon oxide, a composite oxide of one or more doping elements selected from the group consisting of an alkali metal, an alkaline earth metal, and a post-transition metal, and silicon, or a mixture thereof; and silicon nanoparticles dispersed and embedded in the matrix and having a residual compressive stress.

A stress field formed in the matrix around the silicon nanoparticles due to the residual compressive stress of the nanoparticulate silicon dispersed and embedded in the matrix, and further the residual compressive stress of the silicon and the coherent interface formed between the silicon nanoparticle and the matrix, may be indicated as a physical property of the negative electrode material or a measurable parameter as an aspect of the negative electrode material based on the Raman spectrum, another aspect of the negative electrode material based on the mechanical properties, and still another aspect of the negative electrode material based on the electrochemical properties at the time of lithiation.

The negative electrode material may satisfy one or more aspects, two or more aspects, three or more aspects, four or more aspects, five or more aspects, six or more aspects, or seven or more aspects of the aspects (I to VIII) described above, or all the aspects I to VIII.

As a specific example, the negative electrode material may contain, based on an element component, silicon, oxygen, and one or more doping elements selected from the group consisting of an alkali metal, an alkaline earth metal, and a post-transition metal. The silicon may include a silicon component in an element silicon state and a silicon component in an oxide state, and the silicon component in an oxide state may include an oxide state of silicon alone, a composite oxide state of silicon and a doping element, or both these states. The doping element may include a doping element in an oxide state, and the doping element in an oxide state may include an oxide state of a doping element alone, a composite oxide state of silicon and a doping element, or both these states.

The negative electrode material may contain, based on a compound component, silicon oxide, a composite oxide of a doping element and silicon, or a mixture thereof, and may additionally contain element silicon (Si). In the silicon oxide $SiO_x$, x may include a real number of 0.1 to 2. In the composite oxide $D_lSi_mO_n$, D may be a doping element, l may be a real number of 1 to 6, m may be a real number of 0.5 to 2, and n may be a real number satisfying charge neutrality according to the oxidation number of each of D and Si and l and m. As an example, when D is Mg, the composite oxide may include one or more oxides selected from $MgSiO_3$ and $Mg_2SiO_4$, but, the composite oxide with D is not necessarily limited to an oxide with Mg and Mg—Si.

The negative electrode material may include, based on a fine structure, a matrix containing silicon oxide, a composite oxide of one or more doping elements selected from the group consisting of an alkali metal and an alkaline earth metal and silicon, or a mixture thereof; and a dispersed phase including silicon nanoparticles. The dispersed phase may be uniformly dispersed and embedded in the matrix.

As a specific example, the silicon nanoparticle may be a crystalline phase, an amorphous phase, or a composite phase in which a crystalline phase and an amorphous phase are mixed, and may be substantially a crystalline phase.

As a specific example, the matrix may be a crystalline phase, an amorphous phase, or a composite phase in which a crystalline phase and an amorphous phase are mixed. Specifically, the matrix may be a crystalline phase or a composite phase in which a crystalline phase and an amorphous phase are mixed. Specifically, the matrix may contain silicon oxide having a crystalline phase, an amorphous phase, or a composite phase in which an amorphous phase and a crystalline phase are mixed, and a crystalline composite oxide.

The interface between the silicon nanoparticle and the matrix may include a coherent interface, an incoherent interface, or a semi-coherent interface, substantially, may include a coherent interface or a semi-coherent interface, and more substantially, may include a coherent interface. The coherent interface is an interface in which a lattice of two materials forming the interface maintains lattice continuity at the interface, and the semi-coherent interface is an interface in which a partial lattice mismatch portion exists and the lattice mismatch portion may be regarded as a defect such as a dislocation. Therefore, in the negative electrode material having a coherent interface or a semi-coherent interface between the silicon nanoparticle and the matrix, a matrix region in contact with the silicon nanoparticle may be a crystalline phase, and specifically, may be crystalline silicon oxide, a crystalline composite oxide, or a mixture thereof. Experimentally, an interface structure of a coherent interface, an incoherent interface, or a semi-coherent interface may be determined by observation with a high-magnification scanning electron microscope or the like.

As a specific example, an average diameter of the silicon nanoparticles may be a diameter of the order of $10^0$ nanometers to the order of $10^1$ nanometers, specifically, 1 to 50 nm, 2 to 40 nm, 2 to 35 nm, 2 to 30 nm, 2 to 20 nm, or 2 to 15 nm, but is not limited thereto. However, the silicon nanoparticle having a diameter of 30 nm or less forms a coherent interface with the matrix as a whole, and a stress is formed in a region wider than the matrix by the compressive stress remaining in the silicon nanoparticles. Experimentally, the average diameter of the silicon nanoparticles may be calculated by measuring sizes of the silicon nanoparticles in the negative electrode material through images observed with a transmission electron microscope and averaging the measured sizes of 10 or more, 20 or more, or 30 or more silicon nanoparticles.

As a specific example, the doping element may be one or more selected from lithium (Li), sodium (Na), potassium (K), rubidium (Rb), cesium (Cs), beryllium (Be), magnesium (Mg), calcium (Ca), strontium (Sr), barium (Ba), aluminum (Al), gallium (Ga), indium (In), tin (Sn), and bismuth (Bi). The composite oxide may be oxide of silicon and one or more elements selected from lithium (Li), sodium (Na), potassium (K), rubidium (Rb), cesium (Cs), beryllium (Be), magnesium (Mg), calcium (Ca), strontium (Sr), barium (Ba), aluminum (Al), gallium (Ga), indium (In), tin (Sn), and bismuth (Bi). The mechanical properties and the electrochemical properties of the negative electrode material may be further improved by a synergistic effect between the composite oxide and the silicon nanoparticles having a residual compressive stress. In order to easily form a coherent interface with the silicon nanoparticle, the doping element may be the group of an alkali metal and an alkaline earth metal, specifically, one or more elements selected from lithium (Li), sodium (Na), potassium (K), rubidium (Rb), cesium (Cs), beryllium (Be), magnesium (Mg), calcium (Ca), strontium (Sr), and barium (Ba), and in some embodiments, may be an alkaline earth metal, specifically, one or more elements selected from magnesium (Mg), calcium (Ca), strontium (Sr), and barium (Ba). In an embodiment, the doping element may include magnesium in terms of the easy formation of the coherent interface and the synergistic effect with the silicon nanoparticles having a residual compressive stress. As described above, the doping element may be contained in the negative electrode material in a form of a composite oxide with silicon and/or a form of oxide of a doping element, and may be mainly contained in the negative electrode material in a form of a composite oxide. Specifically, in a case where the matrix contains the doping element in a form of a composite oxide with silicon, the composite oxide may include a crystalline composite oxide, and more substantially, the composite oxide may be a crystalline phase. Accordingly, the matrix may contain a crystalline composite oxide.

As a specific example, in the silicon oxide $SiO_x$ contained in the matrix, in which x may be a real number of 0.1 to 2, and more specifically, and may be a real number of 0.5 to 2, a first silicon oxide and a second silicon oxide having different x's may be included. As a substantial example, the silicon oxide contained in the matrix may include a first silicon oxide of $SiO_{x1}$ (x1 is a real number of 1.8 to 2) and a second silicon oxide of $SiO_{x2}$ (x2 is a real number of 0.8 to 1.2). The silicon oxide contained in the matrix may be a crystalline phase, an amorphous phase, or a composite phase of a crystalline phase and an amorphous phase, and may be an amorphous phase.

As a specific example, the negative electrode material may include 15 to 50 wt % of nanoparticulate silicon and a balance of a matrix.

As a specific example, the matrix of the negative electrode material may contain both silicon oxide and a composite oxide, and in the matrix, A/B may be 2 to 50, 2 to 40, 2 to 30, or 2 to 20, in which A is part(s) by weight of the composite oxide with respect to 100 parts by weight of the silicon oxide and B is a concentration of the doping element with respect to wt % in the negative electrode material.

As a specific example, the negative electrode material may be a particulate material. The particulate negative electrode material may have a particle size usually required for use in a secondary battery, for example, an average diameter of the order of $10^0$ μm to the order to $10^1$ μm, and specifically, an average diameter of 5 μm to 30 μm, but the present invention is not limited thereto.

As a specific example, the negative electrode material may further include a coating layer containing carbon, specifically, a surface coating layer coated on a surface of the negative electrode material. The electrical properties of the negative electrode material may be improved by the surface coating layer. A thickness of the coating layer is sufficient as long as it is 2 to 30 nm, but the present invention is not limited thereto.

As a specific example, the negative electrode material includes silicon nanoparticles having a residual compressive stress, and may have an alloying ratio of (more than) 3.5 to 3.75 moles, and specifically, 3.6 to 3.75 moles per 1 mole of silicon, when being electrochemically alloyed with lithium (lithiation). Such a high alloying ratio is significantly advantageous in high capacity. In addition, as a specific example, the negative electrode material may have high initial charge and discharge efficiency and capacity retention rate properties.

In one embodiment, the negative electrode includes the negative electrode material. Specifically, the negative electrode may be a negative electrode for a secondary battery, specifically, for a lithium secondary battery. The negative electrode may include a current collector; and a negative electrode active material layer positioned on at least one surface of the current collector and including the negative electrode material. The negative electrode active material layer may further include a negative electrode material and a binder and conductive material usually used in a negative electrode of a secondary battery.

In one embodiment, the secondary battery includes the negative electrode. Specifically, the lithium secondary battery includes the negative electrode. The lithium secondary battery may include a positive electrode including a positive electrode current collector and a positive electrode active material layer positioned on at least one surface of the positive electrode current collector; the negative electrode; a separator interposed between the positive electrode and the negative electrode; and an electrolyte conducting lithium ions. The positive electrode current collector, the negative electrode current collector, the positive electrode active material or composition of the positive electrode active material layer, the separator, a solvent or an electrolyte salt of the electrolyte, a concentration of the electrolyte salt, and the like may be sufficient as long as they are materials or compositions usually adopted in a lithium secondary battery.

Example 1

Si, $SiO_2$, MgO as raw materials were added to a powder mixer in a molar ratio of 6 (Si):4.5 ($SiO_2$):1.5 (MgO), the raw materials were uniformly mixed to prepare a mixed raw material, and then, the mixed raw material was pelletized using a mold.

26 kg of the pelletized mixed raw material was put into a crucible in a vacuum chamber at 0.1 torr or less, heating was performed to 1,400° C. to vaporize the raw material, and the vaporized raw material was condensed in a collecting plate at 400° C., thereby obtaining magnesium-doped silicon oxide.

The obtained magnesium-doped silicon oxide was subjected to heat treatment in an Ar atmosphere at 850° C. for 20 hours to produce a bulk-type negative electrode material for a secondary battery.

The produced bulk-type negative electrode material for a secondary battery was mechanically pulverized to have an average particle diameter of 5 μm so as to produce a particulate negative electrode material. 5 wt % of carbon was coated on the particulate negative electrode material through a chemical vapor deposition (CVD) process at 850° C. using hydrocarbon gas to produce a carbon-coated negative electrode material powder.

Example 2

Example 2 was performed in the same manner as that of Example 1, except that the respective raw materials were mixed in a molar ratio of 6.5 (Si):4.5 ($SiO_2$):0.5 (MgO).

Example 3

Example 3 was performed in the same manner as that of Example 1, except that the respective raw materials were mixed in a molar ratio of 6.5 (Si):4.5 ($SiO_2$).

Comparative Example 1

Si, $SiO_2$, MgO as raw materials were added to a powder mixer in a molar ratio of 6 (Si):4.5 ($SiO_2$):1.5 (MgO), and the raw materials were uniformly mixed to prepare a raw material.

26 kg of the raw material was put into a crucible in a vacuum chamber at 0.1 torr or less, heating was performed to 1,400° C. to vaporize the raw material, and the vaporized raw material was condensed in a collecting plate at 400° C., thereby obtaining magnesium-doped silicon oxide. The obtained magnesium-doped silicon oxide (bulk-type negative electrode material for a secondary battery) was mechanically pulverized to have an average particle diameter of 5 μm so as to produce a particulate negative electrode material. 5 wt % of carbon was coated on the particulate negative electrode material through a CVD process at 850° C. using hydrocarbon gas to produce a carbon-coated negative electrode material powder.

Comparative Example 2

24 kg of a mixed raw material of Si and $SiO_2$ was put into a crucible A, 2 kg of a metal Mg mass was put into a crucible B, the crucible A and the crucible B were heated at 1,500° C. and 900° C., respectively, to vaporize the materials, and the vaporized materials were condensed in a collecting plate at 900° C., thereby obtaining magnesium-doped silicon oxide.

The obtained magnesium-doped silicon oxide (bulk-type negative electrode material for a secondary battery) was mechanically pulverized to have an average particle diameter of 5 μm so as to produce a particulate negative electrode material. 5 wt % of carbon was coated on the particulate negative electrode material through a CVD process at 850° C. using hydrocarbon gas to produce a carbon-coated negative electrode material powder.

Comparative Example 3

Comparative Example 3 was performed in the same manner as that of Example 1, except that only a Si raw material was used and heating was performed at 2,200° C.

(Experimental Example 1) Deviation of Doping Element Content

Based on the cross section crossing the center of the magnesium-doped silicon oxide (Comparative Example 2) or the bulk-type negative electrode material for a secondary battery obtained by heat treatment (Example 1) before pulverization, A (average content (wt %) of the doping element) and B (standard deviation of the doping element content) were calculated by measuring 100 points at random in a linear composition crossing the center of the cross section by electron dispersive spectroscopy (EDS). The A and B calculated are shown in Table 1. As a result of composition analysis, B/A of the negative electrode material sample produced in Example 1 was 0.25, and B/A of the negative electrode material sample produced in Comparative Example 2 was 0.69.

Additionally, the negative electrode material of Example 1 was pulverized, 150 particles of the negative electrode material were sampled, and then, a composition uniformity of the doping elements included in the particles of the negative electrode material was analyzed. In this case, it was confirmed that UF(D) obtained by dividing an average doping element composition (wt %) between the particles of the negative electrode material by a standard deviation of the doping element composition was 6.2.

(Experimental Example 2) X-Ray Diffraction (XRD) Analysis

A structure of the negative electrode material after pulverization was confirmed by X-ray diffraction (XRD, Rigaku D/MAX-2500/PC, 40 kV, 15 mA, 4° $min^{-1}$, Cu-Kα radiation, λ=0.15406 nm) analysis.

Figure 2:
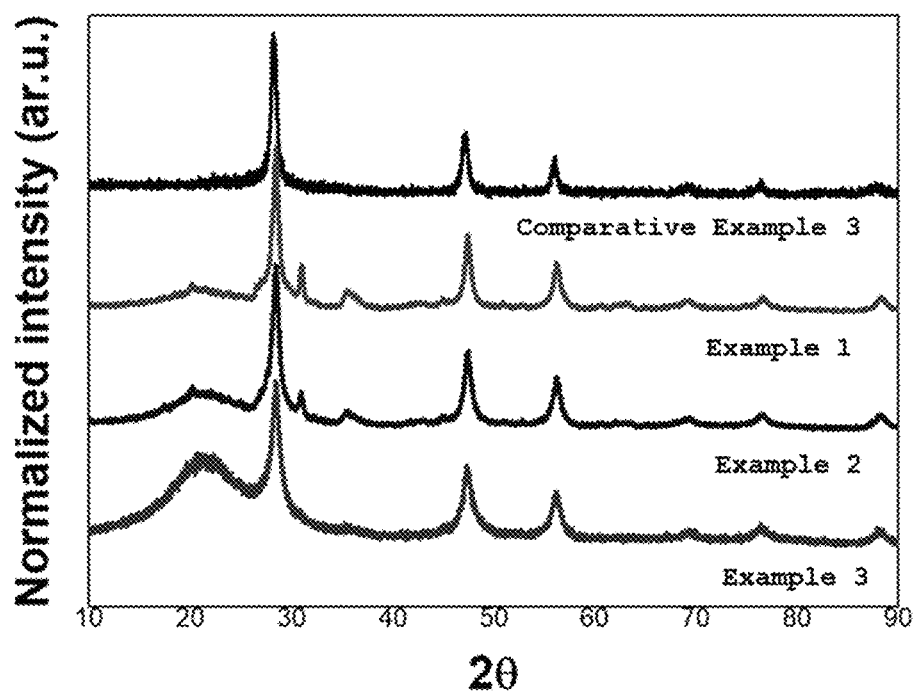
FIG. 2 is a view illustrating X-ray diffraction (XRD) patterns of negative electrode materials produced according to embodiments.

FIG. 2 is a view illustrating XRD patterns of Examples 1 to 3 and Comparative Example 3. As illustrated in FIG. 2, the peak of crystalline silicon (111) was observed at a position of about 28θ in all Examples 1 to 3 and Comparative Example 3, and it was confirmed that the peak present in a region where a diffraction angle 2θ was 10° to 27.4° was broad in Examples 1 to 3, on the other hand, the peak present in the region where the diffraction angle 2θ was 10° to 27.4° was not present in Comparative Example 3. It was appreciated from this that amorphous silicon oxide was included in each of Examples 1 to 3, and amorphous silicon oxide was not included in Comparative Example 3, such that the amorphous silicon oxide included in each of Examples 1 to 3 acted as a buffer against volume expansion during charging of the secondary battery, which resulted in an excellent capacity retention rate of the secondary battery.

Further, in each of Examples 1 to 3, it was confirmed that in the X-ray diffraction pattern, the ratio ($A_1/A_2$) of the area ($A_1$) of the first peak present in the region where the diffraction angle 2θ was 10° to 27.4° to the area ($A_2$) of the second peak present in the region where the diffraction angle 2θ was 28±0.5° was 0.8 to 6.

In addition, in each of Examples 1 to 3, it was confirmed that in the X-ray diffraction pattern, the intensity ratio ($I_1/I_2$) of the maximum intensity ($I_1$) of the first peak present in the region where the diffraction angle 2θ was 10° to 27.4° to the maximum intensity ($I_2$) of the second peak present in the region where the diffraction angle 2θ was 28±0.5° was 0.1 to 1.25. In each of Examples 1 to 3, it was confirmed that the ratio ($L_1/L_2$) of the FWHM ($L_1$) of the first peak to FWHM ($L_2$) of the second peak was 6 to 12.

Figure 3:
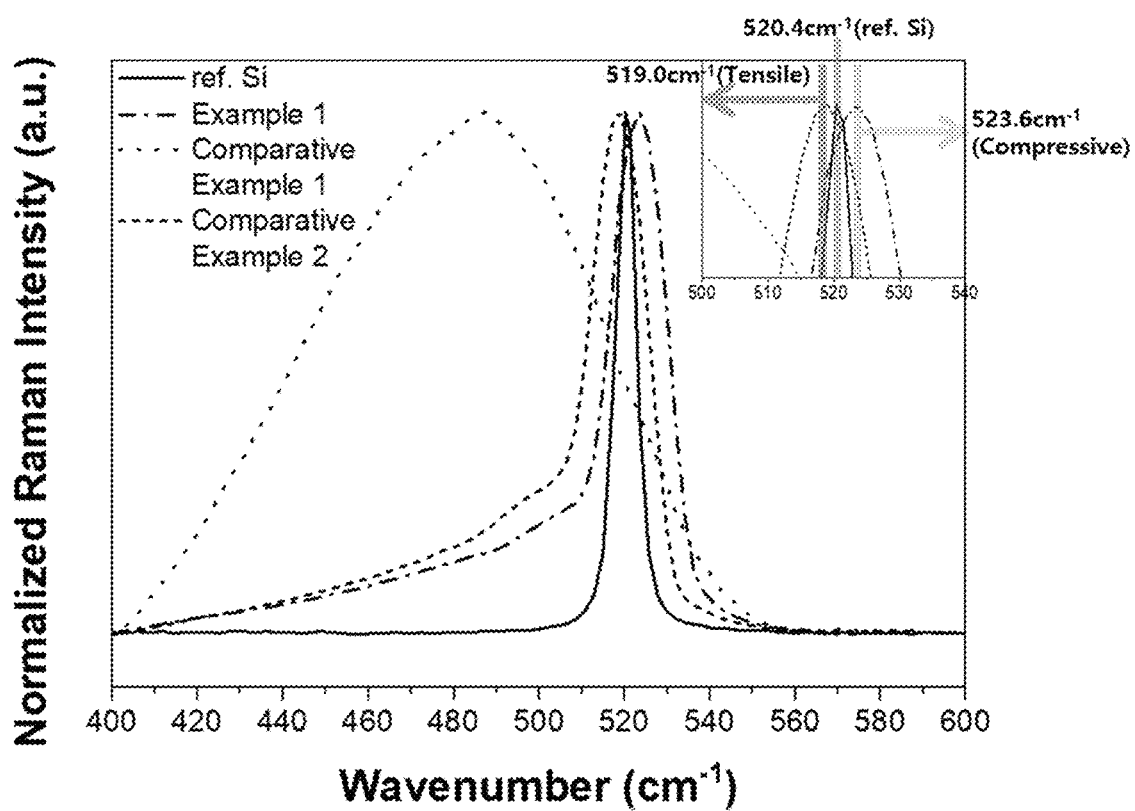
FIG. 3 is a view illustrating Raman spectra of negative electrode materials produced according to embodiments.

(Experimental Example 3) Raman Analysis

μ-Raman (apparatus name: XperRam C, Nanobase, Inc., Korea) analysis was performed on the negative electrode material after pulverization based on the Raman signal of silicon under the following conditions. The Raman signals of the negative electrode material powders are illustrated in FIG. 3. As illustrated in FIG. 3, it could be appreciated that the Raman signal (center of the peak) of silicon of the negative electrode material produced in Example 1 was 523.6 cm$^{-1}$, which showed that the negative electrode material powder had a residual compressive stress. In addition, it could be appreciated that the negative electrode material produced in Comparative Example had a residual tensile stress. In addition, as a result of measuring the FWHM of the Raman signal of silicon of the negative electrode material produced in Example 1, it was confirmed that the FWHM was 12 cm$^{-1}$, which was larger than the FWHM of the Raman signal (C—Si(ref) in FIG. 3) of the single crystal silicon.

Analysis conditions: excitation laser wavelength of 532 nm, laser power of 0.5 mW, resolution of spectrometer of 1 cm$^{-1}$, 1 g of particulate negative electrode material, detector exposure time of 15 sec The stress remaining in the silicon was calculated using the Raman measurement results and the following expression. The residual stress of silicon in the particulate negative electrode material and the residual stress of silicon in the bulk-type negative electrode material are summarized in Table 1. As summarized together with the results of Comparative Examples in Table 1, it could be appreciated that in the case of the negative electrode material produced in Example 1, when the silicon was a bulk type, the residual compressive stress was 0.74 GPa, and when the silicon was a particle type, the residual compressive stress was 0.29 GPa. In addition, it could be appreciated that amorphous Si in Comparative Example 1 and Si in Comparative Example 2 had a tensile stress rather than a compressive stress.

$$\sigma(MPa) = -500 \times \Delta\omega(cm^{-1})$$

wherein σ is a residual stress, Δω is a difference between the Raman signal of the single crystal silicon (Si(ref) of FIG. 3, 520.4 cm$^{-1}$) and the Raman signal of the measured sample (=wavenumber of Raman signal of measured silicon–wavenumber of Raman signal of single crystal silicon), and in this case, when Δω is a positive value, it represents a compressive stress, and when Δω is a negative value, it represents a tensile stress.

Figure 4:
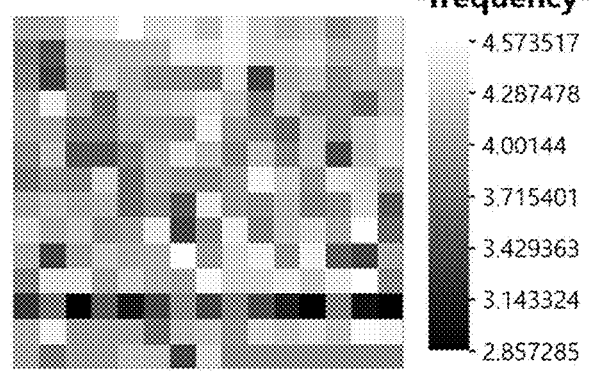
FIG. 4 is a view illustrating results of two-dimensional mapping based on Raman signals of silicon of negative electrode materials produced according to embodiments.
Figure 4:
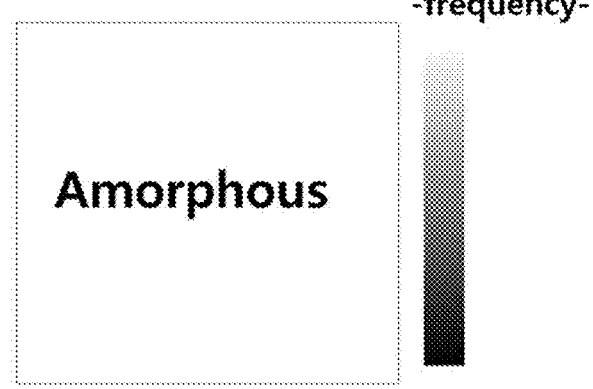
Figure 4:
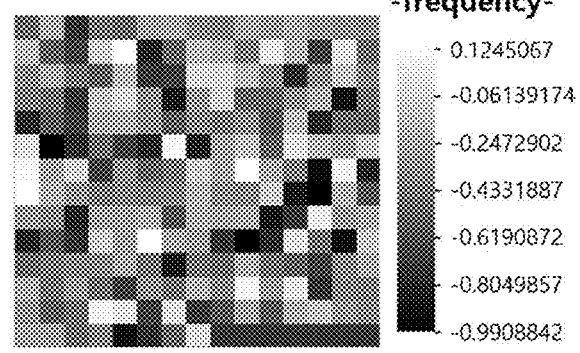

The two-dimensional mapping analysis of the magnesium-doped silicon oxide (Comparative Example 1) or the bulk-type negative electrode material for a secondary battery obtained by the heat treatment (Example 1) before pulverization was performed based on the Raman signal of silicon by μ-Raman analysis (apparatus name: XperRam C, Nanobase, Inc., Korea). The mapping results are illustrated in FIG. 4. In the case of the negative electrode material produced in Example 1, the Raman peak of silicon was detected in all the pixels. As a result of measuring the shift (WN$^i$(Si)−WN(ref)) for each pixel, it was confirmed that the range of the shift was 2.86 (minimum value) to 4.58 (maximum value).

Mapping conditions: excitation laser wavelength=532 nm, laser power=0.1 mW, detector exposure time (exposure time per unit analysis area)=1 sec, focal length=30 mm, grating=1,800 grooves/mm, pixel resolution=1 cm$^{-1}$, and mapping size=14 μm×14 μm In addition, as a result of performing the shift analysis based on the Raman signal of silicon under the same conditions as described above at 20 different positions randomly selected in the negative electrode material having a size of 20 mm×20 mm before pulverization, it was confirmed that the range of the shift measured at the different positions was 2.42 (minimum value) to 4.86 (maximum value). In addition, when the stress of the silicon nanoparticles was analyzed at 20 random different positions, it was confirmed that the compressive stress of the silicon nanoparticle was 88 to 99%.

(Experimental Example 4) Mechanical Properties

The particle hardness was measured using a micro-compressive tester MCT-W manufactured by Shimadzu Corporation. The particle hardness of 10 random particles having a diameter of 10 μm was measured. The measurement results are summarized in Table 1.

The micro-compressive tester continuously applied a force to the particles. At this time, the pressure at which the particles were broken was defined as the particle hardness, and the pressure was automatically measured.

The nanoindentation test was additionally performed on the cross section of the magnesium-doped silicon oxide (Comparative Example 1) or the bulk-type negative electrode material for a secondary battery obtained by the heat treatment (Example 1) before pulverization using a nanoindentation tester (Anton Paar, Austria).

The nanoindentation test (indentation) was performed according to a measurement standard of ISO 14577-1 E under the measurement conditions in which a Berkovich indenter was used, a Poisson's ratio was assumed as 0.3, a maximum load was 50 mN, and a load application rate was 100 mN/min. In this case, the test was performed at a distance of at least 10 um between indentation traces by the indenter in a form of a 5×5 to 25×25 matrix. The hardness and the Young's modulus calculated by the nanoindentation test are illustrated in FIG. 5.

Figure 5:
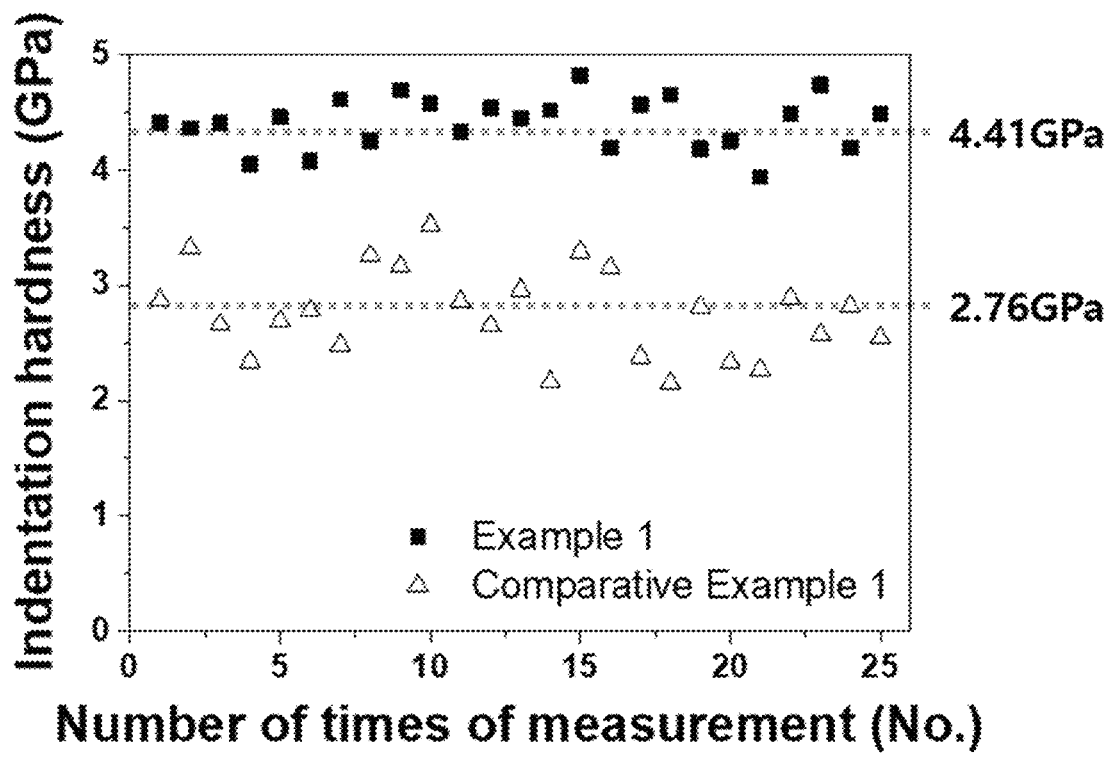
FIG. 5 is a view illustrating results of measuring a hardness and a Young's modulus of negative electrode materials produced according to embodiments.
Figure 5:
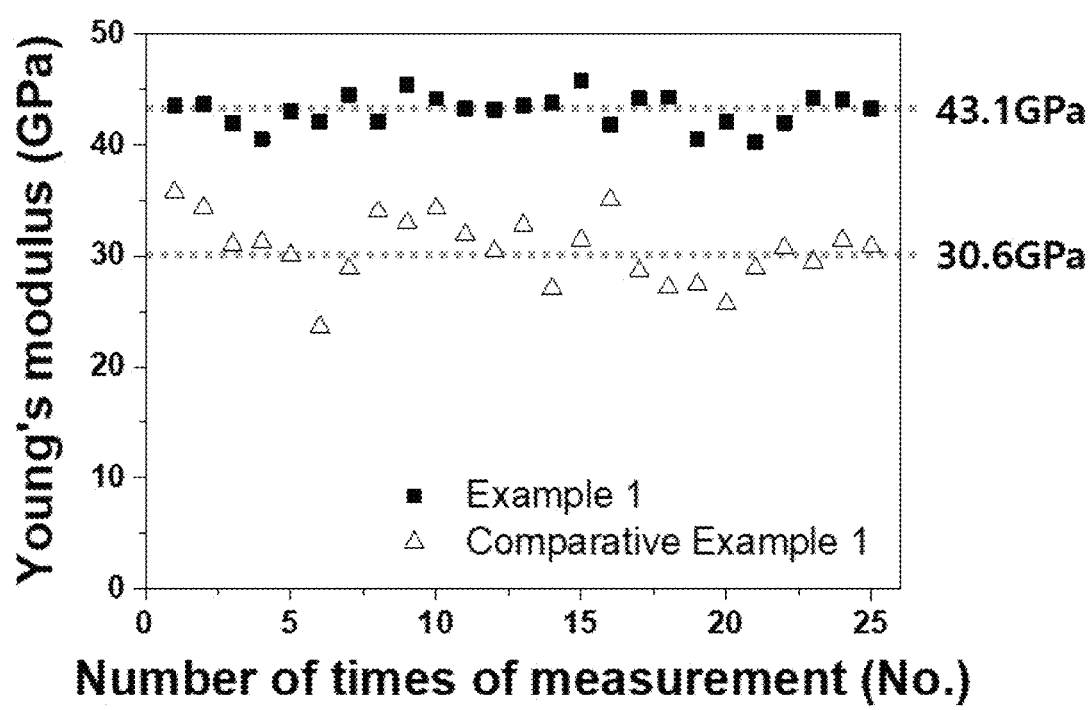

As illustrated in FIG. 5, it was confirmed that the hardness average value and the Young's modulus average value measured by the nanoindentation test in Example 1 were 4.41 GPa and 43.1 GPa, respectively, and the hardness average value and the Young's modulus average value measured by the nanoindentation test in Comparative Example 1 were 2.76 GPa and 30.6 GPa, respectively. It could be appreciated from the results of the nanoindentation test that the hardness and the Young's modulus in Example 1 were about 1.6 times and 1.4 times the hardness and the Young's modulus in Comparative Example 1, respectively, which showed that the mechanical properties in Example 1 were significantly improved.

(Experimental Example 5) Battery Production and Battery Performance Evaluation

The final negative electrode material powder was used as an active material, the active material, a conductive material (carbon black), carboxymethyl cellulose (CMC), and styrene butadiene rubber (SBR) were mixed in a weight ratio of 8:1:0.5:0.5, the mixture was applied on a copper foil having a thickness of 17 μm, and drying was performed at 90° C. for 40 minutes. After drying, punching was performed to a diameter of 14 mm, metallic lithium having a diameter of 16 mm was used as a counter electrode, and an electrolyte was filled with a separator having a diameter of 18 mm interposed between the negative electrode and the counter electrode, thereby producing a CR2032 coin-type half cell. The electrolyte was obtained by dissolving 1 M LiPF$_6$ in a solvent in which ethylene carbonate (EC) and diethyl carbonate (DEC) were mixed in a volume ratio of 1:1 using 3 wt % of fluoroethylene carbonate (FEC) as an additive. In the formation process of the produced battery, the battery was charged (lithiated) to 0.005 V at a constant current of 0.1 C, was charged at a constant voltage of 0.005 V until the current reached 0.01 C, and was discharged (de-lithiated) to 1.5 V at a constant current of 0.1 C (first formation step), and thereafter, the battery was charged (lithiated) again to 0.005 V at a constant current of 0.1 C, was charged at a current voltage of 0.005 V until the current reached 0.01 C, and was discharged (de-lithiated) to 1.0 V at a constant current of 0.1 C (second formation step).

Charge and discharge cycle conditions: the battery is charged (lithiated) to 0.005 V at a constant current of 0.5 C, is charged at a constant voltage of 0.005 V until the current reaches 0.05 C, and is discharged (de-lithiated) to 1.0 V at a constant current of 0.5 C.

The number of times of charge and discharge cycle: 50 times

Figure 6A:
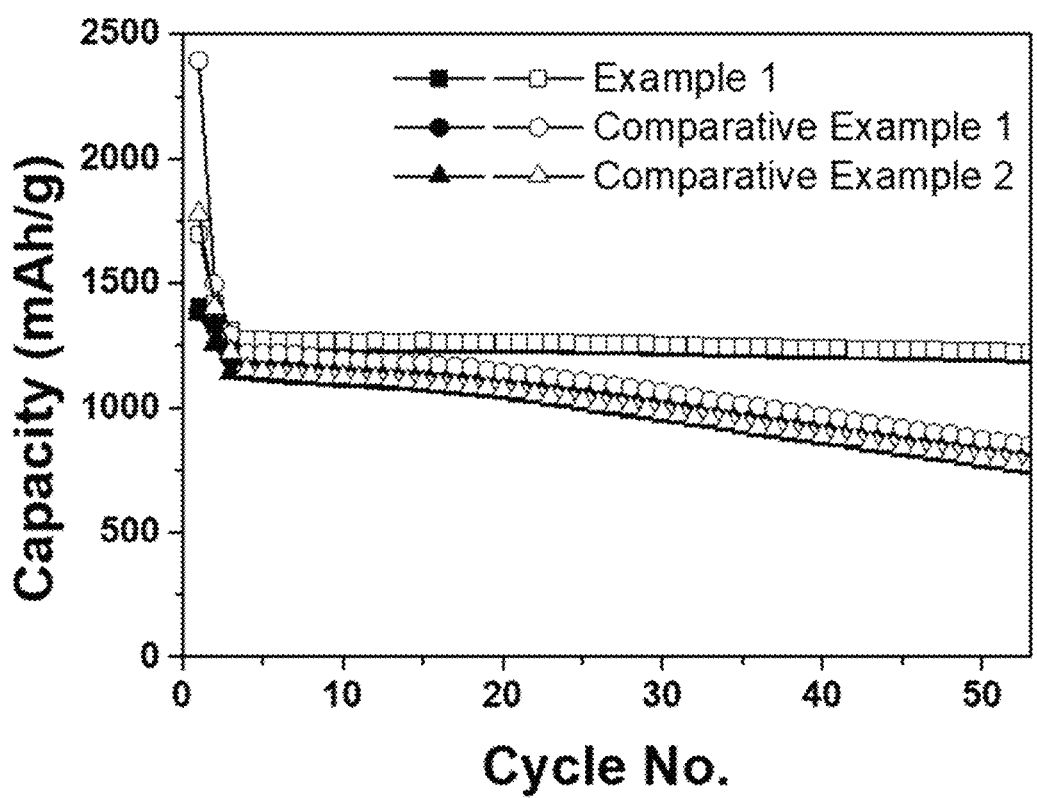
FIGS. 6A and 6B are views illustrating charge and discharge capacities and capacity retention rates according to charge and discharge cycles of half cells each including a negative electrode including a negative electrode material produced according to each of embodiments, respectively.
Figure 6B:
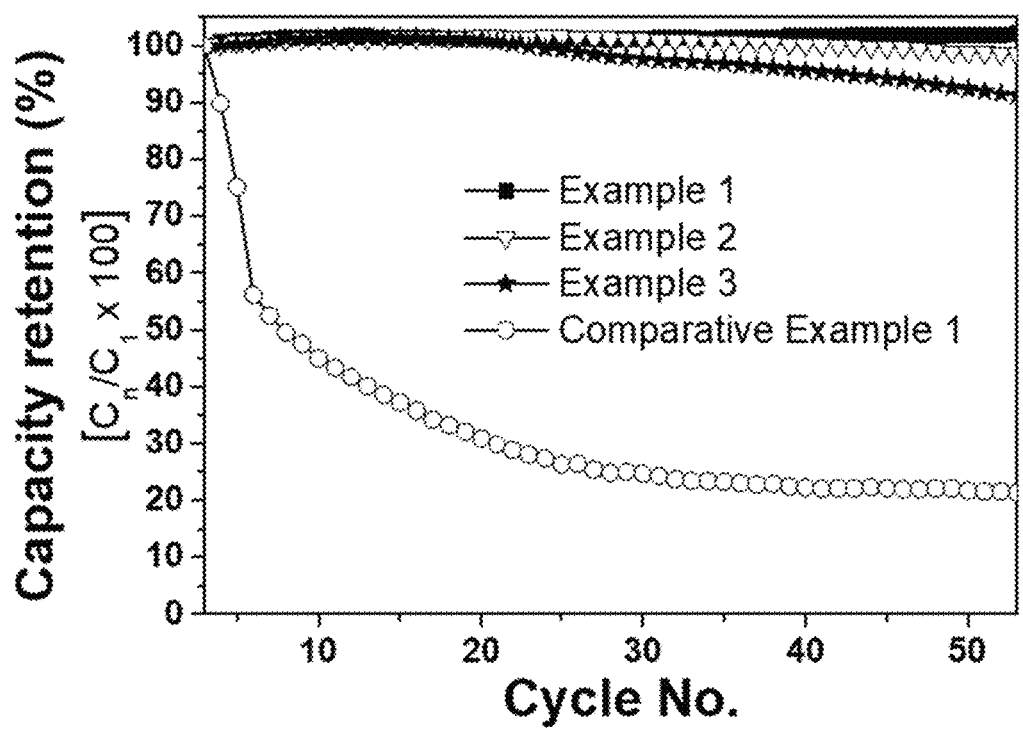

The discharge capacity of the first charge and discharge cycle is summarized as Capacity and shown in Table 1. The initial efficiency of the charging and discharging in the first formation step and the capacity retention rate according to C50/C1*100 after the formation process are also summarized and shown in Table 1. The charge and discharge capacities and capacity retention rates according to the first formation step, the second formation step, and the charge and discharge cycle are illustrated in FIG. 6A and FIG. 6B, respectively.

TABLE 1

| | Example 1 | Comparative Example 1 | Comparative Example 2 | Comparative Example 3 |
|---|---|---|---|---|
| Doping element average content A (%) | 8.1 (Mg) | 8.3 (Mg) | 3.9 (Mg) | — |
| Standard deviation B | 2.01 | 2.08 | 2.68 | — |
| Bulk residual stress (GPa) | −0.74 | Amorphous | 0.43 | 0 |
| Powder residual stress (GPa) | −0.29 | Amorphous | 0.92 | 0 |
| Particle compressive strength (MPa) | 171 | 115 | 95 | 105 |
| Capacity (mAh/g) | 1410 | 1386 | 1376 | 3127 |
| Initial efficiency (%) | 82.9 | 57.9 | 77.5 | 84.7 |
| Capacity retention rate (%, C50/C1 × 100) | 98.4 | 72.1 | 68.7 | 19.6 |

Figure 7:
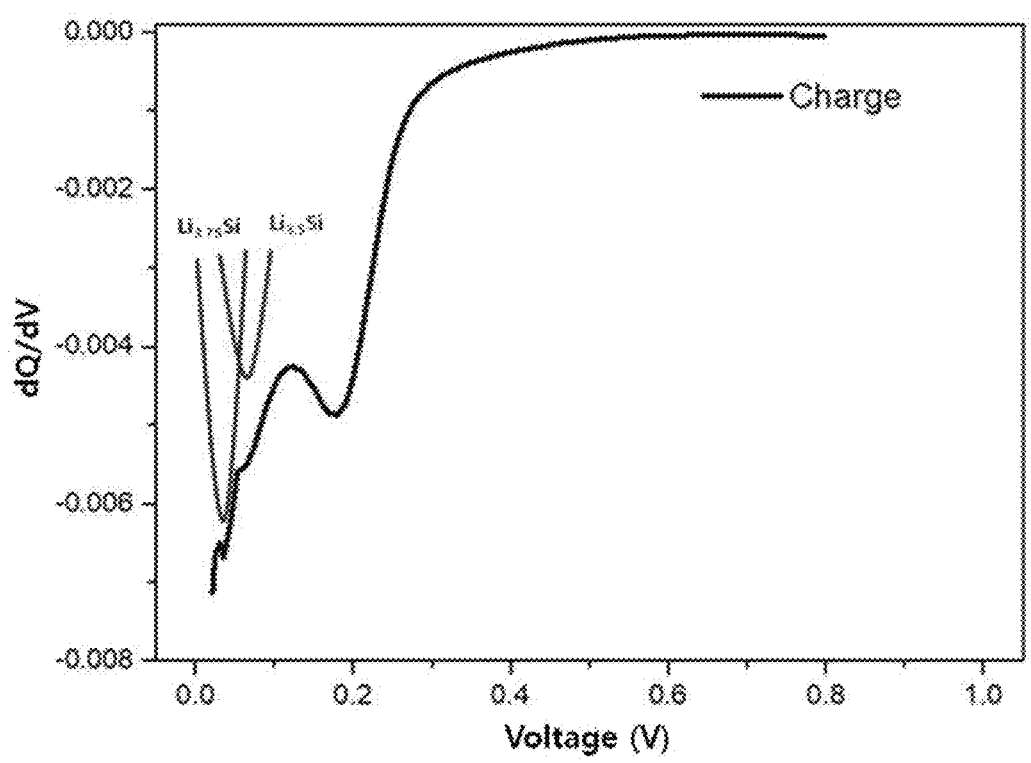
FIG. 7 is a dQ/dV graph of a half cell including a negative electrode including a negative electrode material produced according to an embodiment.

FIG. 7 is a view illustrating a dQ/dV graph at the first charge and discharge cycle. As illustrated in FIG. 7, it could be appreciated that the peak of the lithium intercalation corresponding to the $Li_{3.75}Si$ reaction was present. It could be appreciated from this that when the negative electrode material produced in Example 1 was lithiated, the lithiation was performed at an alloying ratio of 3.75 moles of lithium per mole of silicon.

Figure 8:
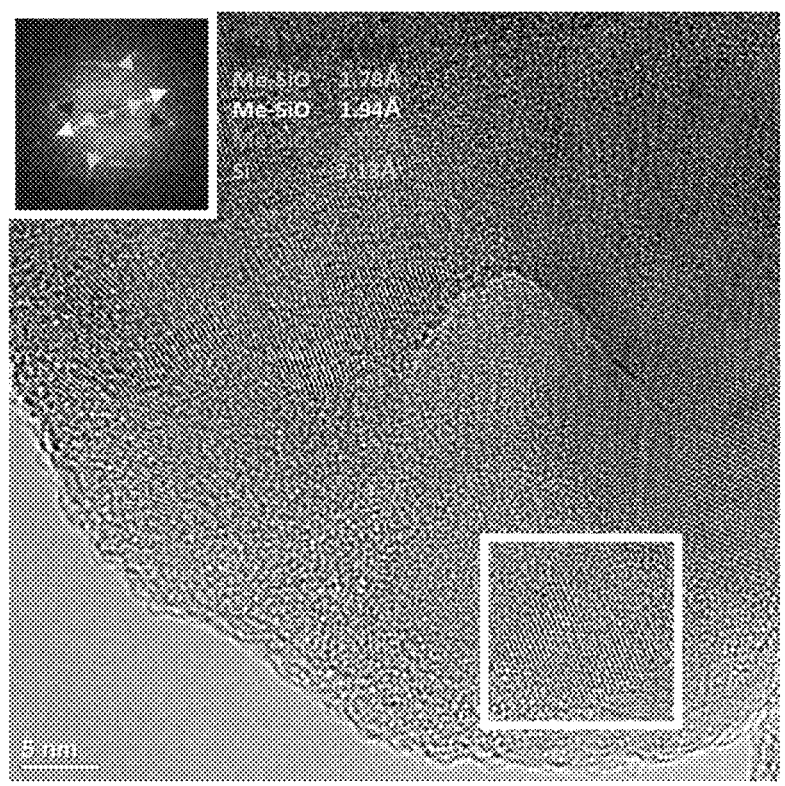
FIG. 8 is a high-magnification transmission electron microscope photograph obtained by observing a negative electrode material produced according to an embodiment.

FIG. 8 is a view illustrating an image of Example 1 obtained with a high-resolution transmission electron microscope (HR-TEM). It was confirmed from FIG. 8 that the average diameter of the crystalline silicon nanoparticles was about 7.1 nm, and as a result of the selected area diffraction pattern (SADP) analysis, the crystalline magnesium silicate was contained in the matrix, and the coherent interface was formed between the silicon nanoparticle and the crystalline magnesium silicate.

Although not illustrated in the drawings, as a result of measuring the particle size distribution of the pulverized and carbon-coated negative electrode material powder, the average particle size (D50) of the negative electrode material powder particles was 7.9 μm.

Figure 9:
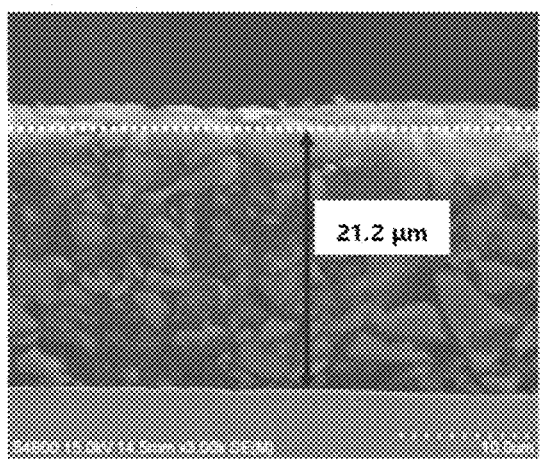
FIG. 9 illustrates scanning electron microscope photographs obtained by observing a cross section and a thickness of a negative electrode active material layer before lithiation and a cross section and a thickness of the negative electrode active material layer after lithiation in a negative electrode including a negative electrode material produced according to an embodiment.
Figure 9:
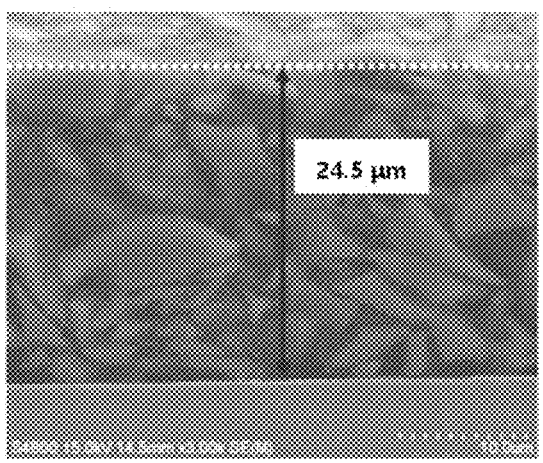

FIG. 9 illustrates a scanning electron microscope photograph obtained by observing the cross section and thickness of the negative electrode active material layer including the negative electrode material of Example 1 before lithiation, and illustrates a scanning electron microscope photograph obtained by observing the cross section and thickness of the negative electrode active material layer after lithiation at 0.005 V at the third charge and discharge cycle (the first charge and discharge cycle in the lifespan evaluation step). It was confirmed that the volume expansion rate due to the thickness change before and after lithiation was only about 15.5%.

As set forth above, the negative electrode material for a secondary battery may have the mechanical properties improved based on the high hardness and the excellent Young's modulus measured by the nanoindentation test by the matrix containing silicon oxide, a composite oxide of one or more doping elements selected from the group consisting of an alkali metal, an alkaline earth metal, and a post-transition metal, and silicon, or a mixture thereof, and the nanoparticulate silicon dispersed and embedded in the matrix, such that the structural stability of the negative electrode material may be secured and the negative electrode material may have excellent electrochemical properties. In particular, the negative electrode material for a secondary battery may have a high discharge capacity and a capacity retention rate at which a secondary battery including the silicon-based negative electrode material may be commercialized.

Although the present embodiments and drawings have been specifically described herein, they are not limited based on these descriptions and various modifications and changes may be made by those skilled in the art.

What is claimed is:

1. A negative electrode material for a secondary battery, comprising:
   a matrix containing silicon oxide, and a composite oxide of a doping element; wherein the doping element is magnesium (Mg), and
   silicon nanoparticles dispersed and embedded in the matrix;
   wherein a hardness and a Young's modulus measured by a nanoindentation test are 4.0 GPa or more and 40 GPa or more, respectively, and in an X-ray diffraction pattern using a CuKα ray, a ratio ($A_1/A_2$) is 0.8 to 6, wherein $A_1$ is an area of a first peak present in a region where a diffraction angle 2θ is 10° to 27.4°, and $A_2$ is an area of a second peak present in a region where the diffraction angle 2θ is 28±0.5°, and
   wherein the negative electrode material satisfies the following Expression 3:

$$B/A \leq 0.65 \quad \text{(Expression 3)}$$

wherein A is an average value (A) obtained by averaging contents (wt %) of the doping element measured at 100 random points based on a cross section crossing the center of the negative electrode material, and B is a standard deviation (B) of the contents of the doping element.

2. The negative electrode material of claim 1, wherein in the X-ray diffraction pattern, a ratio ($L_1/L_2$) of a full-width at half maximum (FWHM) ($L_1$) of the first peak to a full-width at half maximum (FWHM) ($L_2$) is 6 to 15.

3. The negative electrode material of claim 1, wherein an intensity ratio ($I_1/I_2$) of a maximum intensity ($I_1$) of the first peak to a maximum intensity ($I_2$) of the second peak is 0.05 to 1.25.

4. The negative electrode material of claim 1, wherein the first peak is derived from amorphous silicon oxide, and the second peak is derived from crystalline silicon.

5. The negative electrode material of claim 1, wherein an FWHM of a Raman peak of nanoparticulate silicon contained in the negative electrode material is larger than an FWHM of a Raman peak of bulk single crystal silicon.

6. The negative electrode material of claim 5, wherein the FWHM of the Raman peak of the nanoparticulate silicon contained in the negative electrode material is 4 to 20 cm$^{-1}$.

7. The negative electrode material of claim 5, wherein the following Expression 1 is satisfied based on a Raman signal of silicon, $$1 < WN(\text{Si})/WN(\text{ref}) \quad \text{(Expression 1)}$$

wherein WN(ref) is the center wavenumber of the Raman peak of the bulk single crystal silicon, and WN(Si) is the center wavenumber of the Raman peak of the nanoparticulate silicon contained in the negative electrode material.

8. The negative electrode material of claim 7, wherein when the negative electrode material is subjected to two-dimensional mapping analysis based on a Raman signal of silicon, a difference between a maximum value and a minimum value of a shift defined by the following Expression 2 under the following mapping conditions is 5 cm$^{-1}$ or less, Mapping conditions: excitation laser wavelength=532 nm, laser power=0.1 mW, detector exposure time (exposure time per unit analysis area)=1 sec, focal length=30 mm, grating=1,800 grooves/mm, pixel resolution=1 cm$^{-1}$, and mapping size=14 μm×14 μm, $$\text{Shift} = WN^i(\text{Si}) - WN(\text{ref}) \quad \text{(Expression 2)}$$

wherein WN(ref) is the same as defined in Expression 1, and WN(Si) is the center wavenumber of the Raman peak of the nanoparticulate silicon contained in the negative electrode material in one pixel that is the unit analysis area at the time of the mapping analysis.

9. The negative electrode material of claim 8, wherein when a shift is analyzed based on a Raman signal of silicon at 20 different positions at random in a 20 mm×20 mm sample, a difference between a maximum value and a minimum value of a shift defined by the following Expression 2 is 5 cm$^{-1}$ or less, Mapping conditions: excitation laser wavelength=532 nm, laser power=0.1 mW, detector exposure time (exposure time per unit analysis area)=1 sec, focal length=30 mm, grating=1,800 grooves/mm, and pixel resolution=1 cm$^{-1}$, $$\text{Shift} = WN^i(\text{Si}) - WN(\text{ref}) \quad \text{(Expression 2)}$$

wherein WN(ref) is the same as defined in Expression 1, and WN(Si) is the center wavenumber of the Raman peak of the nanoparticulate silicon contained in the negative electrode material in one pixel that is the unit analysis area at the time of the mapping analysis.

10. The negative electrode material of claim 1, wherein when a stress of the silicon nanoparticle is analyzed at 20 different positions at random in a 20 mm×20 mm sample, a compressive stress is 80% or more.

11. The negative electrode material of claim 1, wherein the negative electrode material includes a plurality of negative electrode material particles, and the particles have a composition uniformity represented by the following Expression 3, $$1.3 \leq UF(D) \quad \text{(Expression 3)}$$

wherein UF(D) is a value obtained by dividing an average doping element composition of the negative electrode material particles by a standard deviation of a doping element composition based on wt % of the composition.

12. The negative electrode material of claim 1, wherein an average diameter of the silicon nanoparticles is 2 to 30 nm.

13. The negative electrode material of claim 1, wherein an interface between the silicon nanoparticle and the matrix is a coherent interface.

14. The negative electrode material of claim 1, wherein the negative electrode material is in a form of particles having an average diameter of 5 μm to 30 μm.

15. The negative electrode material of claim 1, further comprising a coating layer that contains carbon and is coated on a surface of the negative electrode material.

16. A secondary battery comprising the negative electrode material for a secondary battery of claim 1.

* * * * *